United States Patent
Carrillo et al.

(10) Patent No.: US 11,818,842 B1
(45) Date of Patent: Nov. 14, 2023

(54) CONFIGURABLE CIRCUIT BOARD FOR ABSTRACTING THIRD-PARTY CONTROLS

(71) Applicant: Amazon Technologies, Inc., Seattle, WA (US)

(72) Inventors: David E. Carrillo, Bellevue, WA (US); Jin Li, Sammamish, WA (US); Xingang Guo, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 630 days.

(21) Appl. No.: 16/812,043

(22) Filed: Mar. 6, 2020

(51) Int. Cl.
| | | |
|---|---|---|
| *H05K 1/02* | (2006.01) | |
| *H05K 1/14* | (2006.01) | |
| *H05K 1/16* | (2006.01) | |
| *H05K 3/32* | (2006.01) | |
| *H05K 3/36* | (2006.01) | |
| *H05K 5/00* | (2006.01) | |
| *H05K 7/00* | (2006.01) | |
| *H05K 7/10* | (2006.01) | |
| *H05K 13/08* | (2006.01) | |
| *H01L 23/00* | (2006.01) | |
| *H01R 12/77* | (2011.01) | |

(52) U.S. Cl.
CPC ............ *H05K 1/141* (2013.01); *H05K 1/145* (2013.01); *H05K 1/16* (2013.01); *H05K 3/32* (2013.01); *H05K 13/08* (2013.01)

(58) Field of Classification Search
CPC . H05K 1/14; H05K 1/16; H05K 1/117; H05K 1/118; H05K 1/141; H05K 1/145; H05K 1/189; H05K 3/32; H05K 3/36; H05K 5/00; H05K 7/00; H05K 7/10; H05K 13/08; H05K 13/207; H05K 1/02; H05K 3/326; H01L 23/00; H01R 12/16; H01R 12/77
USPC ........ 174/250; 361/707, 719, 723, 752, 788, 361/789, 796, 809; 324/73, 158
See application file for complete search history.

(56) References Cited

U.S. PATENT DOCUMENTS

| | | | | |
|---|---|---|---|---|
| 4,443,756 A | * | 4/1984 | Lightbody ......... | H01R 13/2421 324/750.25 |
| 4,528,500 A | * | 7/1985 | Lightbody ......... | H01R 13/2421 324/537 |
| 4,724,383 A | * | 2/1988 | Hart .................. | G01R 1/07378 324/750.25 |
| 5,157,325 A | * | 10/1992 | Murphy ............. | G01R 1/07335 324/755.05 |
| 5,442,299 A | * | 8/1995 | Caggiano ........... | G01R 1/07328 324/763.01 |

(Continued)

*Primary Examiner* — Xiaoliang Chen
(74) *Attorney, Agent, or Firm* — Lee & Hayes, P.C.

(57) ABSTRACT

A circuit board can be configured to access features and controls associated with a third-party circuit board. One or more spring-loaded pins or other connectors can contact one or more interaction points of the third-party circuit boards and form a connection. The circuit board can include a common or generic interface that the connections with the third-party circuit board are routed through by the circuit board. The generic interface can then connect the circuit board and third-party circuit board to external power sources, telecommunication devices, and connection ports. Based on the connection between the circuit board and the third-party circuit board, a user device can be assigned to and remotely access the features and controls of the third-party circuit board.

20 Claims, 12 Drawing Sheets

(56) References Cited

U.S. PATENT DOCUMENTS

| | | | | |
|---|---|---|---|---|
| 5,633,598 | A * | 5/1997 | Van Loan | G01R 1/07328 324/755.05 |
| 5,923,529 | A * | 7/1999 | Mimachi | G06F 13/409 361/785 |
| 5,945,838 | A * | 8/1999 | Gallagher | G01R 1/07378 324/750.25 |
| 6,002,605 | A * | 12/1999 | Iwasaki | G06Q 20/229 365/51 |
| 6,025,729 | A * | 2/2000 | Van Loan | G01R 1/07328 324/756.07 |
| 6,066,957 | A * | 5/2000 | Van Loan | G01R 1/07357 324/750.19 |
| 6,140,830 | A * | 10/2000 | Ott | G01R 1/07328 324/755.05 |
| 6,194,908 | B1 * | 2/2001 | Wheel | G01R 1/07328 324/763.01 |
| 6,341,066 | B1 * | 1/2002 | Murowaki | H05K 7/20854 257/723 |
| 6,359,452 | B1 * | 3/2002 | Mozzetta | G01R 1/0408 324/750.25 |
| 6,420,885 | B1 * | 7/2002 | Fredrickson | G01R 31/2875 324/762.01 |
| 8,446,729 | B2 * | 5/2013 | Schuette | G06F 3/0658 361/752 |
| 9,252,521 | B1 * | 2/2016 | Beaman | H01R 12/718 |
| 9,276,335 | B2 * | 3/2016 | Fricker | H01R 12/523 |
| 9,880,201 | B2 * | 1/2018 | Wang | G01R 31/2891 |
| 10,806,038 | B1 * | 10/2020 | Fan | H05K 1/189 |
| 2001/0017766 | A1 * | 8/2001 | Murowaki | H05K 5/0069 361/752 |
| 2002/0186551 | A1 * | 12/2002 | Murowaki | H05K 1/148 361/752 |
| 2008/0013259 | A1 * | 1/2008 | Barton | H05K 5/0013 361/809 |
| 2008/0101049 | A1 * | 5/2008 | Casto | H05K 1/14 361/788 |
| 2008/0183933 | A1 * | 7/2008 | Peng | H05K 7/1429 710/302 |
| 2009/0163051 | A1 * | 6/2009 | Miki | G01R 1/0483 439/68 |
| 2010/0159723 | A1 * | 6/2010 | Tan | H01R 12/721 439/153 |
| 2010/0241799 | A1 * | 9/2010 | Schuette | G06F 3/0626 711/E12.007 |
| 2010/0283498 | A1 * | 11/2010 | Gulzow | G01R 31/2808 324/763.01 |
| 2011/0148448 | A1 * | 6/2011 | St. Onge | G01R 31/31905 702/85 |
| 2011/0273203 | A1 * | 11/2011 | Romanov | G01R 31/2812 324/763.01 |
| 2012/0320548 | A1 * | 12/2012 | Lu | H05K 1/141 361/760 |
| 2013/0038999 | A1 * | 2/2013 | Tian | H05K 1/0231 361/679.41 |
| 2013/0073768 | A1 * | 3/2013 | Cong | G06F 13/409 710/301 |
| 2013/0321241 | A1 * | 12/2013 | Lin | H01Q 1/2275 343/906 |
| 2014/0162470 | A1 * | 6/2014 | Fricker | H01R 12/523 439/65 |
| 2015/0046621 | A1 * | 2/2015 | Yang | G06F 13/4068 710/301 |
| 2015/0318650 | A1 * | 11/2015 | Qian | H04B 1/3816 439/620.15 |
| 2016/0187381 | A1 * | 6/2016 | Jang | G01R 1/06722 324/755.05 |
| 2016/0351526 | A1 * | 12/2016 | Boyd | H01L 24/81 |
| 2018/0205170 | A1 * | 7/2018 | Andre | H01R 12/712 |
| 2019/0052186 | A1 * | 2/2019 | Hayashi | H05K 5/0026 |
| 2020/0088787 | A1 * | 3/2020 | Ochotorena, Jr. | G01R 31/69 |
| 2020/0161788 | A1 * | 5/2020 | Lin | H01R 13/506 |
| 2021/0190827 | A1 * | 6/2021 | Brecht | G01R 1/07314 |

* cited by examiner

CONFIGURABLE CIRCUIT BOARD FOR ABSTRACTING THIRD-PARTY CONTROLS

BACKGROUND

Presently, features and controls provided by third-party circuit boards are commonly utilized by vehicles in industrial, commercial, and consumer settings. The features and controls provided by the third-party circuit boards are generally accessed by individuals in possession of the third-party circuit board and physically manipulate buttons or triggers associated with circuits and interaction points. Once an individual selects a feature or control, the third-party circuit board subsequently executes the feature or control. Additionally, features and controls associated with the third-party circuit board can be standard interactions associated with vehicles (i.e., lock and unlock functions associated with automobile key fobs). Despite the standardization of individual features and controls, the third-party circuit boards, and by extension the key fobs/controllers associated with the third-party circuit boards, associated with the features and controls include significant variations between manufacturers and individual vehicle models. Accordingly, an organization that utilizes multiple vehicle models and/or multiple vehicles designed by different manufacturers must track individual key fobs that are utilized by employees to access individual vehicles.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
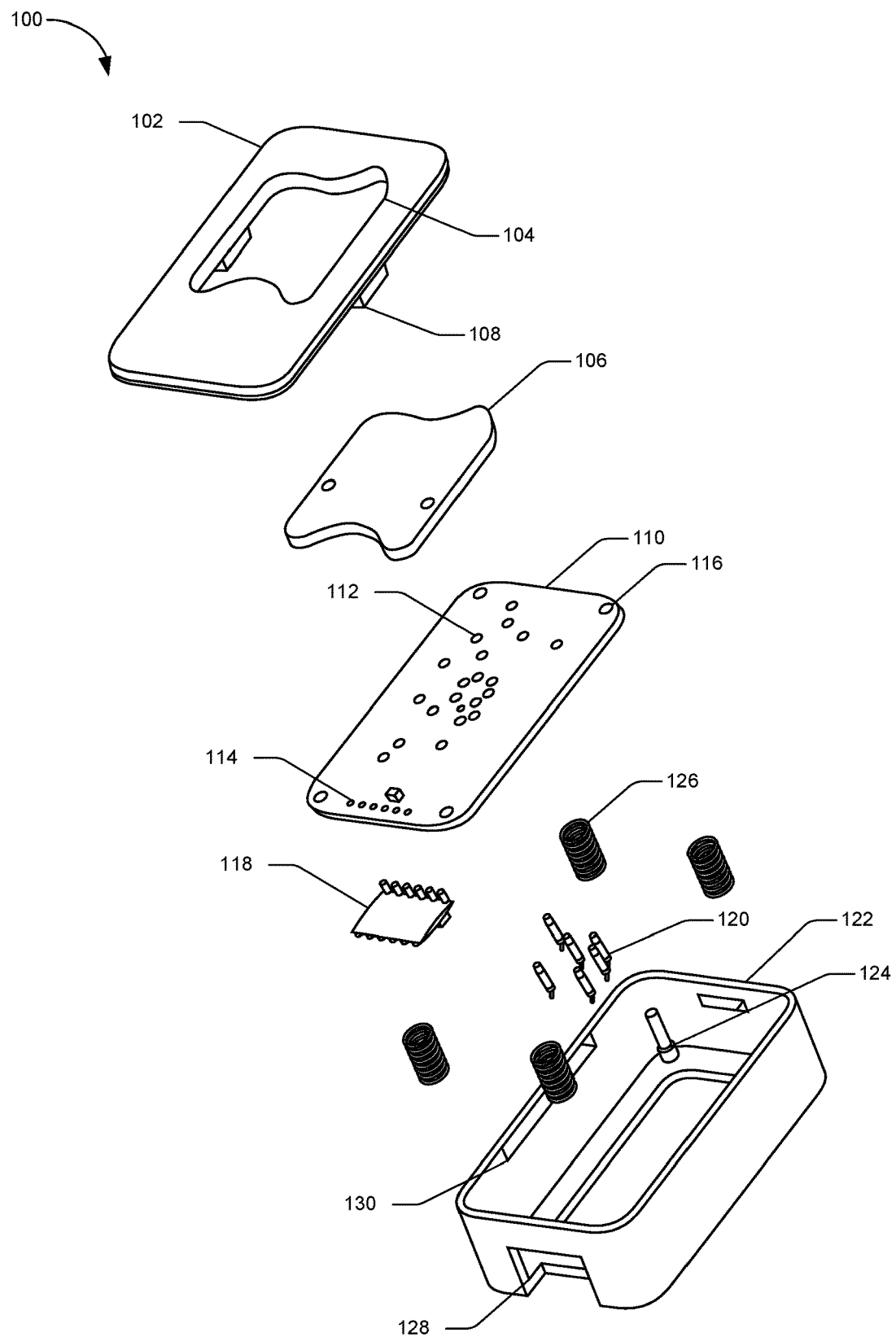
FIG. 1 illustrates an example device that is configured to be assembled to abstract, or otherwise generalize, one or more controls and features available via a third-party circuit board such that they can be accessed remotely by one or more users.

Described herein are systems and/or processes for abstracting third-party circuit boards (e.g., custom, prefabricated, etc.) such that a common generic interface (i.e., standard interface) can be utilized to access the controls and/or features associated with the third-party circuit boards. The described systems and/or processes utilize a configurable circuit board designed to interface with the third-party circuit board. The configurable circuit board is configured to minimize the complexity involved when trying to integrate a third-party circuit board and/or customizable circuit boards with the common generic interface such that the third-party circuit board and/or the customizable circuit board can be integrated into an overarching system and/or process. Additionally, the configurable circuit board can be mated, connected, or otherwise associated with one or more individual third-party circuit boards such that the controls and/or features provided by the third-party circuit board can be remotely accessed by a user device. Further, the remote access can be freely assigned and/or transferred between one or more user devices without exchanging and/or transferring the third-party circuit board.

In some embodiments, a third-party circuit board is a circuit board that can be manufactured for and/or by a company associated with a mechanical good such as a vehicle, an automated device, or other devices that can receive signals that trigger a function associated with the mechanical good. The third-party circuit board can include one or more circuits that cause a signal to be transmitted to an associated mechanical good when a trigger is activated (i.e., a button being pressed, a lever being toggled, an electrical signal being received) by a user. Commonly, the circuits of the third-party circuit boards are made from a conductive metal (e.g., copper, gold, etc.) printed onto a plastic substrate (e.g., a phenolic resin) such that electrical impulses can be transferred between two points based on the circuits and, optionally, logic processors (e.g., CPUs, GPUs) embedded into the plastic substrate. Generally, individual third-party circuit boards are associated with a single mechanical good that is configured to receive the signal transmitted by the associated third-party circuit board. Though other third-party circuit boards are considered herein, a common example is the circuit board found within key fobs associated with automobiles. Each key fob is associated with a particular automobile and can send signals that cause specific functions of the automobile to be triggered. Similarly, control devices for unmanned aerial vehicles (UAVs) can include circuit boards that are associated with and send signals to a particular UAV that cause the UAV to turn, accelerate, ascend, descend, and perform other functions. Accordingly, third-party circuit boards can be device specific sources for one or more signals that trigger one or more controls and/or features associated with the device.

In some embodiments, the configurable circuit board can be designed to enable the abstraction of one or more third-party circuit boards from a third-party interface to a common or generic interface. In particular, the configurable circuit board is a circuit board that is produced to connect, combine, or otherwise mate with one or more third-party circuit boards and serves as an adaptor for the one or more third-party circuit boards. Similar to the third-party circuit board, the configurable circuit board can include one or more circuits made from a conductive metal (e.g., copper, gold, etc.) printed onto a plastic substrate (e.g., a phenolic resin) such that electrical impulses can be transferred between two points based on the circuits and, optionally, logic processors (e.g., CPUs, GPUs) embedded into the plastic substrate. Additionally, the configurable circuit board can include one or more configurable connection points that are associated with the one or more third-party circuit boards that are connected to a physical interface that permits signals to be transferred from user devices to the third-party circuit boards and trigger one or more controls and/or features of the third-party circuit boards.

In some embodiments, the configurable circuit board can be configured to connect and/or mate with one or more third-party circuit boards via one or more pins that connect to the one or more third-party circuit boards and terminate into the common and/or generic physical interface. In at least one embodiment, connecting and/or mating the configurable circuit board and the third-party circuit board comprises securing the configurable circuit board with the third-party circuit board such that one or more signal transferring connections are created and maintained between the two circuit boards. In some additional embodiments, interfacing with a plurality of third-party circuit boards can be accomplished by via one or more configurable pins. Additionally, the one or more configurable pins can be installed or otherwise affixed to the configurable circuit board to form one or more connections with the third-party circuit board. Further, the configurable circuit board can be configured such that the one or more configurable pins occupy various locations on the configurable circuit board to form the one or more connections with a selected third-party circuit board. The locations that the one or more configurable points can occupy are generally determined based at least on one or more third-party circuit boards that the configurable circuit board was designed to interface with.

In some embodiments, a combination of a generic case base associated with the configurable circuit board and a fabricated lid associated with the third-party circuit board can ensure correct alignment of the configurable circuit board, the one or more configurable pins, and the third-party circuit board. Additionally, the generic case base and the custom lid can further ensure the continuous connection and maintain the one or more connections between the third-party circuit and the configurable circuit board via the one or more pins. In at least one embodiment, the above embodiments can be consolidated into an implementation for integrating a plurality of third-party circuit boards with a single generic interface implemented via the configurable circuit board.

In some embodiments, a configurable circuit board can be designed to include one or more configurable connection points. In at least one embodiment, the configurable connection points can accept connectors such as linear pins, spring pins, one-to-one pins, one-to-many pins, and/or other configurable pins configured to form a connection between a point and/or an area on the configurable circuit board and an associated point and/or an associated area on the third-party circuit board. Additionally, the configurable connection points can be a hole or a socket in the configurable circuit board where a connector can be affixed and/or attached to the configurable circuit board. In at least one additional embodiment, the one or more connectors can be selectively added or removed to the configurable circuit board to form one or more connections between the configurable circuit board and the third-party circuit board. Additionally, the one or more connectors can be affixed and/or attached to the configurable circuit board based on a selected third-party circuit board in which the configurable circuit board will mate and/or connect. In at least one further embodiment, the one or more configurable connection points can be completely populated with connectors such that each of the one or more connection points is associated with a connector. Additionally, a mask and/or an insulator can be utilized to prevent one or more connectors from forming a connection with the third-party circuit board. Accordingly, the mask and/or the insulator can permit a set of connectors to connect with the third-party circuit board and isolate the one or more remaining connectors from the third-party circuit board.

In some additional embodiments, the configurable circuit board can be designed and fabricated such that a first set of connection points (i.e., configurable connection points) associated with the configurable circuit board aligns with one or more interface points associated with a first third-party circuit board. Additionally, the configurable circuit board can be designed and fabricated such that a second set of connection points associated with the configurable circuit board aligns with one or more interface points associated with a second third-party circuit board. Further, the configurable circuit board can be designed and fabricated such that multiple sets of connection points align with one or more third-party circuit boards. In at least one embodiment, a set of connection points can be specific to a third-party circuit board such that the set of connection points are only populated with connectors when the configurable circuit board is being connected and/or mated with the third-party circuit board. In at least one additional embodiment, individual connection points can be shared by multiple sets of connection point such that a connection point can be populated with a connector when the configurable circuit board is being connected and/or mated with multiple third-party circuit boards of the plurality of third-party circuit boards associated with the configurable circuit board.

In some further embodiments, a third-party circuit board can include one or more interaction points. The interaction points can be specific locations on the third-party circuit board that act as contacts capable of sending and receiving signals and/or currents to other components of the third-party circuit board. Additionally, signals received at individual interaction points can trigger the controls and/or features that are specific to and/or associated with the individual interaction points. Further, the interaction points can send signals related to controls and/or features of the third-party circuit board. Accordingly, a configurable circuit board can access the controls and/or features of the third-party circuit board by forming connections, via one or more connectors, with at least a set of the interaction points on the third-party circuit board. In at least one embodiment, the interaction points can be test points, debug points, circuit leads, DPIO points, and/or other interaction points that allow signals to be transferred between the third-party circuit board and the configurable circuit board.

In some embodiments, a configurable circuit board can be designed for the abstraction of a class of third-party circuit boards for utilization in a system via a common physical interface. In particular, third-party circuit boards associated with similar functions, features, and controls are generally individually distinct in layout, interaction points, and trigger requirement. Additionally, the interaction points associated with the third-party circuit boards can commonly be triggered by other circuits, such as the configurable circuit board described herein. Further, the configurable circuit board can be configured to match a third-party circuit board, form a connection with the interaction points, and enable a standard method of triggering the functions, features, and controls without interacting with the variable third-party circuit boards themselves. Instead, users can interact with the configurable circuit board and accordingly trigger the desired function, features, and controls. In at least one embodiment, the configurable circuit board can be designed to connect with third-party circuit boards obtained from automobile key fobs having controls and features such as a lock function (i.e., causing doors and entry points of an associated automobile to be secured and prevent entry), an unlock function (i.e., causing doors and entry points of the automobile to permit entry), alarm trigger, and other common automobile features (e.g., remote start of the automobile engine, causing a trunk or storage area of the automobile to open, etc.). Additionally, a set of third-party circuit boards can be selected to include key fob circuit boards from various automobile manufacturers, the key fob circuit boards comprising different circuit board layouts, profiles, features, and interaction points. Generally, a layout of configurable connection points can be designed based at least in part on the interaction points associated with each of the third-party circuit boards. Additionally, the layout of the configurable connection points for the configurable circuit board can be designed based at least in part on the interaction points that are selected for utilization by the system via the physical interface. In at least one additional embodiment, the layout of the configurable connection points can be determined to form connections with at least the interaction points associated with the lock and unlock functions on the key fob circuit board. Further, the connection between a configurable connection point and an interface point associated with a feature such as the lock and unlock functions of the key fob circuit board can further cause a transmitter associated with the key fob circuit board to emit a signal and trigger a selected function with an automobile associated with the key fob (i.e., selecting unlock via the common generic interface and the configurable circuit board causes the key fob circuit board to emit the unlock signal and unlock the automobile).

It should be noted that while the implementation of commands associated with an automobile key fob are commonly referenced as an example, the configurable circuit board can abstract controls and/or features associated with other third-party circuit boards. For example, third-party circuit boards associated with flight controls for unmanned aerial vehicles can be abstracted via integration with a configurable circuit board. Controls for ascension, descension, acceleration, deceleration, steering, release of an item, and associated features can be abstracted via the configurable circuit board forming connections with various interaction points associated with the controls and/or features. Alternatively, the third-party circuit boards can provide controls for activating mechanical goods (e.g., causing an automated door to open and shut).

In some embodiments, a common, generic, and/or physical interface is connected to one or more configurable connection points associated with a configurable circuit board. The physical interface can facilitate connections between a third-party circuit board, the configurable circuit board, and external resources. The external resources can include power sources, communication systems, and additional processing capabilities. In at least one embodiment, the physical interface can comprise plurality of contacts that are associated with a control or feature of the third-party circuit board. For example, a first contact can be associated with an unlock function for an automobile, a second contact can be associated with a lock function for the automobile, and a third contact can be associated with an alarm function for the automobile. In at least one additional embodiment, the physical interface can comprise a first contact associated with a power source and a second contact associated with an electrical ground. In at least one further embodiment, the individual contacts of the physical interface can be associated with one or more configurable connection points. For example, a contact can be associated with the unlock function for the automobile wherein the contact is associated with a first configurable connection point that can connect to a first interaction point on a first third-party circuit board and a second configurable connection point that can connect to a second interaction point on a second third-party circuit board.

The techniques described herein permit the utilization of one or more controls and/or features that are associated with a plurality of third-party circuit boards without distributing the plurality of third-party circuit boards to and transferring the third-party circuit boards between individual users. In general, the controls and/or features associated with individual third-party circuit boards are specific actions that can be caused by the circuit board. The actions can be implemented by devices directly connected to the third-party circuit board, remotely associated with the third-party circuit board via one or more transceivers, or otherwise configured to receive commands from the individual third-party circuit boards. The actions can be triggered by an electrical signal that is received by the third-party circuit board from the press of a button, a wired connection, or other connection with interaction points of the third-party circuit board (i.e., spring-loaded pins contacting a debug/testing point on the third-party circuit board). Additionally, the techniques enable the plurality of third-party circuit boards to be integrated into a larger system that permits the controls and/or features to be accessed, at will and/or by assignment, by users of the system as a whole. Further, incorporation of the third-party circuit boards into the systems described below can permit the secure association of the third-party circuit board with the vehicle, mechanical good, and/or mechanisms associated with the controls and/or features while distributing access to the controls and/or features as necessary. Accordingly, the systems and techniques described herein reduce the administrative load on a company by providing a distributed network of controls and/or features that can be freely assigned to individuals as required by the company. Additionally, the systems and techniques provide the means to actively track individual access and use of the controls and features provided. Abstraction of controls and/or feature from individual third-party circuit boards through configurable circuit board and a common physical interface permits the utilization of one or more features of a third-party circuit board by individual users without providing direct access to the one or more features.

In at least one embodiment, the abstraction of third-party circuit boards can reduce the administrative load and increase the efficiency for a delivery fleet associated with a logistics company. In particular, the delivery fleet can comprise a plurality of automobile models from one or more manufacturers. Each automobile in the fleet can be associated with a specific key fob that comprises a third-party circuit board that can include controls such as an unlock control, a lock control, and a trigger alarm control. Additionally, the key fobs associated with the plurality of automobiles can include different circuit board layouts and/or different features. Further, the plurality of automobiles may have different drivers assigned to the same automobile on different days, requiring the individual key fobs to be tracked and transferred between the individual drivers assigned to the automobile.

In at least one additional embodiment, the third-party circuit boards can be removed and analyzed to determine a layout of interaction points, wherein the interactions points are associated with the features and/or controls of the third-party circuit board. For example, a lock feature interaction point, an unlock feature interaction point, and an alarm trigger interaction point can be identified on the third-party circuit board. Additionally, multiple layouts can be combined to form a single configurable circuit board capable of mating and/or connecting with a third-party circuit board to provide access to the lock feature, the unlock feature, and the alarm trigger via a physical interface associated with the configurable circuit board. Accordingly, for each automobile in the delivery fleet of the logistics company, the third-party circuit board can be connected to the configurable circuit board. The combination of the third-party circuit board and the configurable circuit board can be housed within a configurable case. The configurable case can then be connected to the associated automobile.

In at least one further embodiment, the combination of the third-party circuit board, the configurable circuit board, and the configurable case can be mounted within the associated automobile and provide access to the features and/or controls of the third-party circuit board via an abstract control interface. For example, the configurable case can further include a transceiver that allows for communication between the abstract control interface and the configurable circuit board via a cellular network, Wi-Fi, a radio transmission network and/or Bluetooth® communications that can receive a selection of an unlock command via the abstract control interface. Similarly, the transmitter can integrate the features made available via the configurable circuit board into cloud services that are accessible via a user device. Alternatively, the generic interface can allow the physical connection of the user device to the configurable circuit board and access the features of the third-party circuit board (e.g., the device can connect via USB, micro-USB, Lightning® connectors, and other signal transfer connections). The selection of the unlock command can be received from a device associated with a driver that has been assigned to the vehicle by a central server. Accordingly, the driver can be granted access to the automobile via the controls provided by the third-party circuit board without physical possession and/or transfer of the third-party circuit board itself. Instead, the device is granted remote access to the controls via the abstract control interface once the drive, and by association the device, is assigned to the automobile. It should be noted that while specific communication technologies are discussed, any form of transceiver can be utilized to remotely access and utilize the features of the third-party circuit board.

FIG. 1 illustrates an example system 100 that can be assembled to abstract, or otherwise generalize, controls and features of a third-party circuit board such that the controls and features can be accessed remotely by one or more users. In particular, FIG. 1 illustrates a fabricated lid 102 that comprises a first circuit board holder 104, configured to accept and secure a third-party circuit board 106, and a securing mechanism 108. Additionally, FIG. 1 illustrates a configurable circuit board 110 that comprises one or more configurable connection points 112, one or more physical interface connection points 114, and one or more standoff slots 116. A physical interface 118 can be attached to the configurable circuit board 110 at the one or more physical interface connection points 114. Similarly, one or more connectors 120 can be attached to the configurable circuit board 110 via a set of the one or more configurable connection points 112. Further, the configurable circuit board 110 can be inserted into a generic base 122 and secured via one or more standoffs 124 and one or more standoff springs 126. The generic base 122 can further comprise a physical interface port 128, and an attachment point 130. In some embodiments of FIG. 1, the example system 100 can be a device comprised of the above components that is constructed after a specific third-party circuit board has been selected for integration into the example system 100. Additionally, while FIG. 1 illustrates the example system 100 as an enclosed container, the example system 100 can be a frame where each of the top surface, the bottom surface, and one or more side surfaces are connected at the intersection of the respective surfaces.

In some embodiments of FIG. 1, the fabricated lid 102 can be prefabricated based on a footprint of the third-party circuit board 106, manufactured once the third-party circuit board 106 is obtained, or otherwise obtained such that the fabricated lid 102 includes the first circuit board holder 104 and the securing mechanism 108. The fabricated lid 102 can be a top wall (i.e., first wall) of the example system 100 that maintains a connection between the third-party circuit board 106 and the configurable circuit board 110, protects the internal components (i.e., third-party circuit board 106, configurable circuit board 110, physical interface 118, etc.) of the example system 100, and prevents tampering with and/or damage to the internal components of the example system 100. Additionally, the fabricated lid 102 can, in combination with the generic base 122, compress the one or more connectors 120 and/or the standoff springs 126 such that the one or more connectors 120 and/or the standoff springs 126 apply a force to the configurable circuit board 110 that maintains the connection between the configurable circuit board 110 and the third-party circuit board 106. In at least one embodiment, the first circuit board holder 104 can be a socket that is shaped to match the third-party circuit board 106 and functions to secure the third-party circuit board 106 within the fabricated lid 102. In at least one additional embodiment, the circuit board holder 104 can be a cutout that matches the shape of the third-party circuit board 106. In some additional embodiments, the securing mechanism 108 can be utilized to secure the fabricated lid 102 to the generic base 122, forming the example system 100 illustrated by FIG. 1. The securing mechanism 108 can include latches configured to attach to the generic base 122, inserts that match slots in walls of the generic base 122, and/or other means of combining the fabricated lid 102 and the generic base 122. In some further embodiments, the securing mechanism 108 can be utilized to secure the third-party circuit board 106 in combination with the circuit board holder 104. For example, the securing mechanism 108 can be utilized as a set of guides that restrict or prevent movement of the third-party circuit board 106. In at least one further embodiment, the fabricated lid 102 can comprise a top surface and/or a top wall of the example system 100.

In some embodiments of FIG. 1, the generic case base 122 can comprise one or more standoffs 124 that can be associated with one or more standoff springs 126. The generic case base 122 can be a bottom wall (i.e., second wall) of the example system 100 that maintains a connection between the third-party circuit board 106 and the configurable circuit board 110, protects the internal components (i.e., third-party circuit board 106, configurable circuit board 110, physical interface 118, etc.) of the example system 100, and prevents tampering with and/or damage to the internal components of the example system 100. Additionally, the generic case base 122 can, in combination with the fabricate lid 102, compress the one or more connectors 120 and/or the standoff springs 126 such that the one or more connectors 120 and/or the standoff springs 126 apply a force to the configurable circuit board 110 that maintains the connection between the configurable circuit board 110 and the third-party circuit board 106. The one or more standoffs 124 and the one or more standoff springs 126 can be utilized to secure the configurable circuit board 110 and prevent movement of the configurable circuit board 110 within the generic base 122 and relative to the third-party circuit board 106. In particular, the one or more standoffs 124 can be configured to insert into one or more points on the configurable circuit board 110 and prevent lateral movement of the configurable circuit board 110 within the generic case base 122. Additionally, the one or more standoff springs 126 can be utilized to maintain contact between the one or more connectors 120 and the third-party circuit board 106. Further, the one or more standoff springs 126 can be compressed by the formation of the example system 100 such that they apply a constant force to the configurable circuit board 110 that maintains contact between the one or more connectors 120 and the interaction points associated with the third-party circuit board 106. In at least one embodiment, the attachment point 130 can further prevent movement of the configurable circuit board 110 relative to the third-party circuit board 106 by securing the fabricated lid 102 to the generic case base 122 in combination with the securing mechanism 108.

In some embodiments of FIG. 1, the fabricated lid 102 and the generic case base 122 can be combined to form a device. In at least one embodiment, the device can be an enclosed box with solid walls that contains the mated, combined, and/or connected third-party circuit board and configurable circuit board. In at least one additional embodiment, the device can be a frame comprised of a top wall (i.e., fabricated lid 102), a bottom wall (i.e., generic case base 122), and one or more side walls that secure the top wall and the bottom wall at a fixed distance.

In some embodiments of FIG. 1, the one or more connectors 120 can be configured to be removably secured to the one or more configurable connection points 112. Additionally, the one or more connectors 120 can be configured to form a connection between the third-party circuit board 106, the configurable circuit board 110, and the physical interface connection points 114. Further, the one or more connectors 120 can be attached to a set of the one or more configurable connection points 112 based at least on a determination of a layout of interaction points associated with the third-party circuit board 106 that will be connected with the configurable circuit board 110. In at least one embodiment, the one or more connectors 120 can be linear connection pins, spring-loaded pins, configurable pins, or other pins that can be configured to form a connection between the third-party circuit board 106 and the configurable circuit board 110. Additionally, the one or more connectors 120 can enable the transmission of signals between the third-party circuit board 106 and the configurable circuit board 110 such that the controls and features provided by the third-party circuit board 106 can be accessed by the configurable circuit board 110.

In some additional embodiments of FIG. 1, the one or more configurable connection points 112 include at least a set of configurable connection points that is associated with the third-party circuit board 106. Additionally, the one or more configurable connection points 112 can include an additional set of configurable connection points that is associated with an additional third-party circuit board. Further, individual connection points of the set and the additional set can be associated with individual physical interface connection point such that individual connection points associated with a control or feature of the third-party circuit board 106 and the additional third-party circuit board route signals and connections through the same physical interface connection point.

In some embodiments of FIG. 1, the example system 100 can be assembled from the various circuit boards and components to form an enclosed case comprised of the fabricated lid 102 attached to the generic case base 122. The third-party circuit board 106, secured within the fabricated lid 102, can be associated with the configurable circuit board 110 such that a connection is formed by the one or more connectors 120. The connection can be maintained by the one or more standoffs 124 securing the position of the configurable circuit board 110 relative to the generic case 122, the fabricated lid 102 being secured relative to the generic case 122 by a combination of the securing mechanism 108 and the attachment point 130, and the third-party circuit board 106 being secured to the fabricated lid 102 by the circuit board holder 104 and optionally the securing mechanism 108. Additionally, the one or more connectors 120 can maintain the connection between the third-party circuit board 106 and the configurable circuit board 110 based on at least one of the one or more connectors 120 being spring-loaded or otherwise adjustable length connectors and/or the one or more standoff springs 126 applying sufficient force to the configurable circuit board 110. In at least one embodiment, the physical interface 118 can be connected to the configurable circuit board 110 via the physical interface connection point 114. Additionally, the physical interface 118 can provide a connection point to the vehicle, mechanism, or other machine that is associated with the third-party circuit board 106. For example, the third-party circuit board 106 can be a key fob for an automobile and the physical interface 118 can permit the example system to connect to the OBD-II port within the automobile for at least a power supply.

Figure 2A:
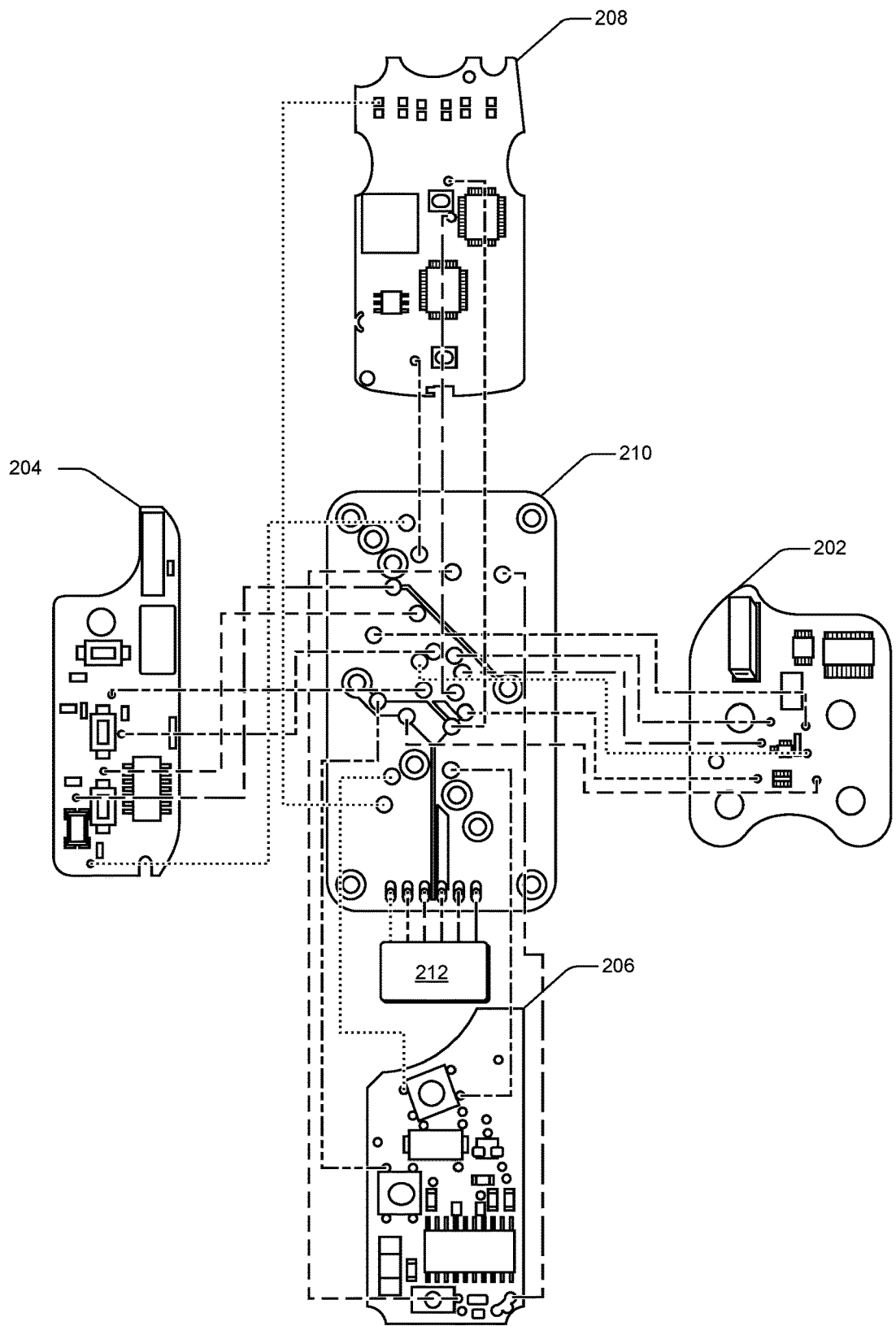
FIG. 2A illustrates an example circuit board designed to be associated with one or more selected third-party circuit boards such that controls and features of the third-party circuit boards are available via a generic interface.

FIG. 2A illustrates an example configurable circuit board designed to potentially associate with up to four different third-party circuit boards. However, it is contemplated that greater than for third-party circuit boards can be associated with the configurable circuit board. In particular, a first circuit board 202, a second circuit board 204, a third circuit board 206, and a fourth circuit board 208 are individually associated with a layout of interaction points associated with controls and features of the third-party circuit boards. Additionally, a configurable circuit board 210 comprises a plurality of connection point sets that align with the layout of interaction points associated with each of the third-party circuit boards (i.e., the first circuit board 202, the second circuit board 204, the third circuit board 206, and the fourth circuit board 208). The connection point sets can then route the connection to the interaction points through the generic interface 212. In at least one embodiment, the generic interface 212 can include a ground lead for the configurable circuit board 210 that can provide at least a zero potential reference point for signals received by the circuit board and/or electrical circuits of the third-party circuit boards 202-208 and the configurable circuit board 210. Additionally, the generic interface 212 can include a power lead for the configurable circuit board 210 that can supply power to components of the configurable circuit board 210 and/or components associated with the third-party circuit boards.

Figure 2B:
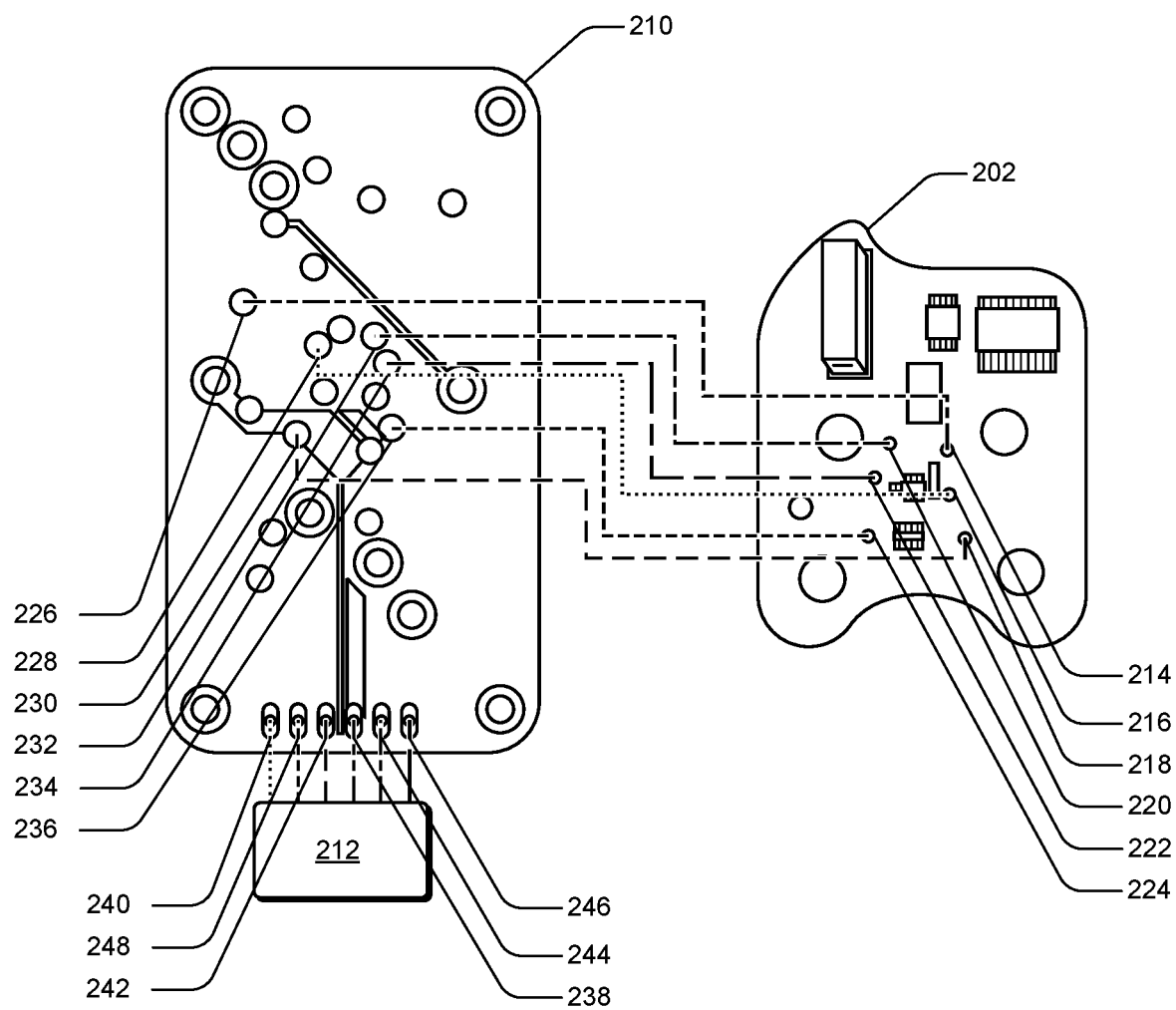
FIG. 2B illustrates an example circuit board that is paired with a selected third-party circuit board from a group of third-party circuit boards, where the example circuit board is configurable to form a plurality of connections with a plurality of interface points associated with the selected third-party circuit board.

FIG. 2B illustrates a first circuit board 202 that is selected to combine with the configurable circuit board 210 such that a first set of configurable contact points of the configurable circuit board 210 align with one or more interaction points 214-224 associated with the first circuit board 202. In particular, the configurable circuit board 210 can include the first set of configurable contact points comprising configurable contact points 226-236. Additionally, the configurable contact points 226-236 can be associated with generic interface leads 238-248.

In some embodiments of FIG. 2B, the first circuit board 202 can include the one or more interaction points 214-224. In particular, the one or more interaction points 214-224 can individually be associated with a control and/or feature of the first circuit board 202, a device associated with the first circuit board 202, a vehicle associated with the first circuit board 202, and/or other functions triggered by the first circuit board 202. Accordingly, a first interaction point 214 can be associated with a first control, a second interaction point 216 can be associated with a second control, and the interaction points 218-224 can similarly be associated with additional controls and/or features. In at least one embodiment, an interaction point can be associated with a ground for the circuits and components of the first circuit board 202. In at least one additional embodiment, the interaction point can be associated with a power source for the circuits and components of the first circuit board 202.

Figure 2C:
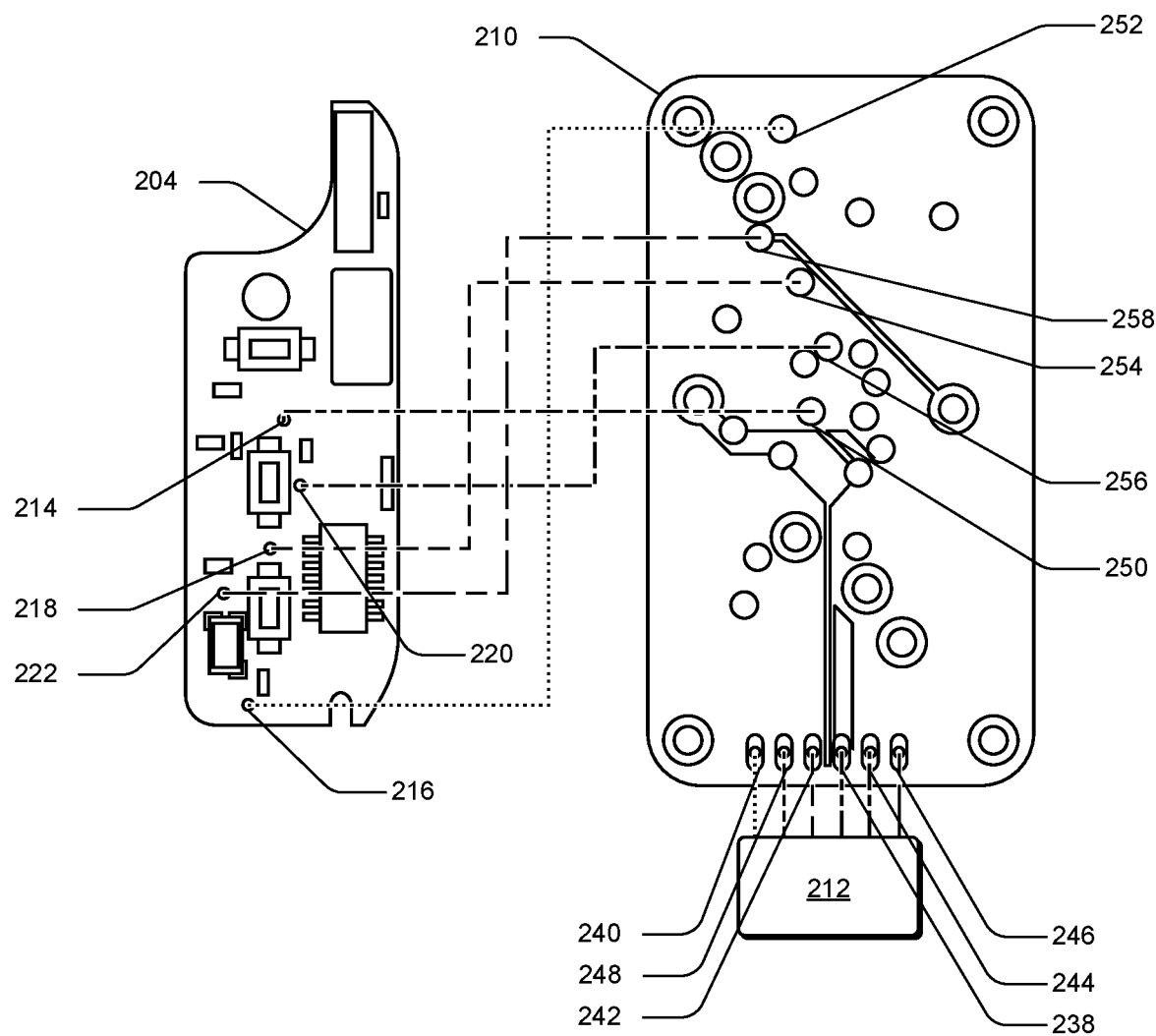
FIG. 2C illustrates an example circuit board that is paired with an alternative third-party circuit board from the group of third-party circuit boards, where the example circuit board is configurable to form a plurality of connections with the alternative third-party circuit board via one or more connection points.

FIG. 2C illustrates a second circuit board 204 that is selected to combine with the configurable circuit board 210 such that a second set of configurable contact points of the configurable circuit board 210 align with one or more interaction points 214-222 associated with the second circuit board 204. In particular, the configurable circuit board 210 can include the second set of configurable contact points comprising configurable contact points 250-258. Additionally, the configurable contact points 250-258 can be associated with the generic interface leads 238-246.

In some embodiments of FIG. 2C, the second circuit board includes one or more interaction points 214-222 that are individually associated with a control or feature of the second circuit board 204, a device associated with the second circuit board 204, a vehicle associated with the second circuit board 204, and/or other functions triggered by the second circuit board 204. In particular, the second circuit board 204 is associated with one or more controls and/or features that can be also provided by the first circuit board 202. Additionally, the one or more controls and/or features provided by the first circuit board 202 and the second circuit board 204 can be similarly associated with interaction points 214-224. It should be noted that the second circuit board 204 can provide a subset of the controls and/or features also provided by the first circuit board 202. Accordingly, and as displayed by FIG. 2C, the controls and/or features provided by the second circuit board 204 can be associated with interaction points 214-222.

Figure 2D:
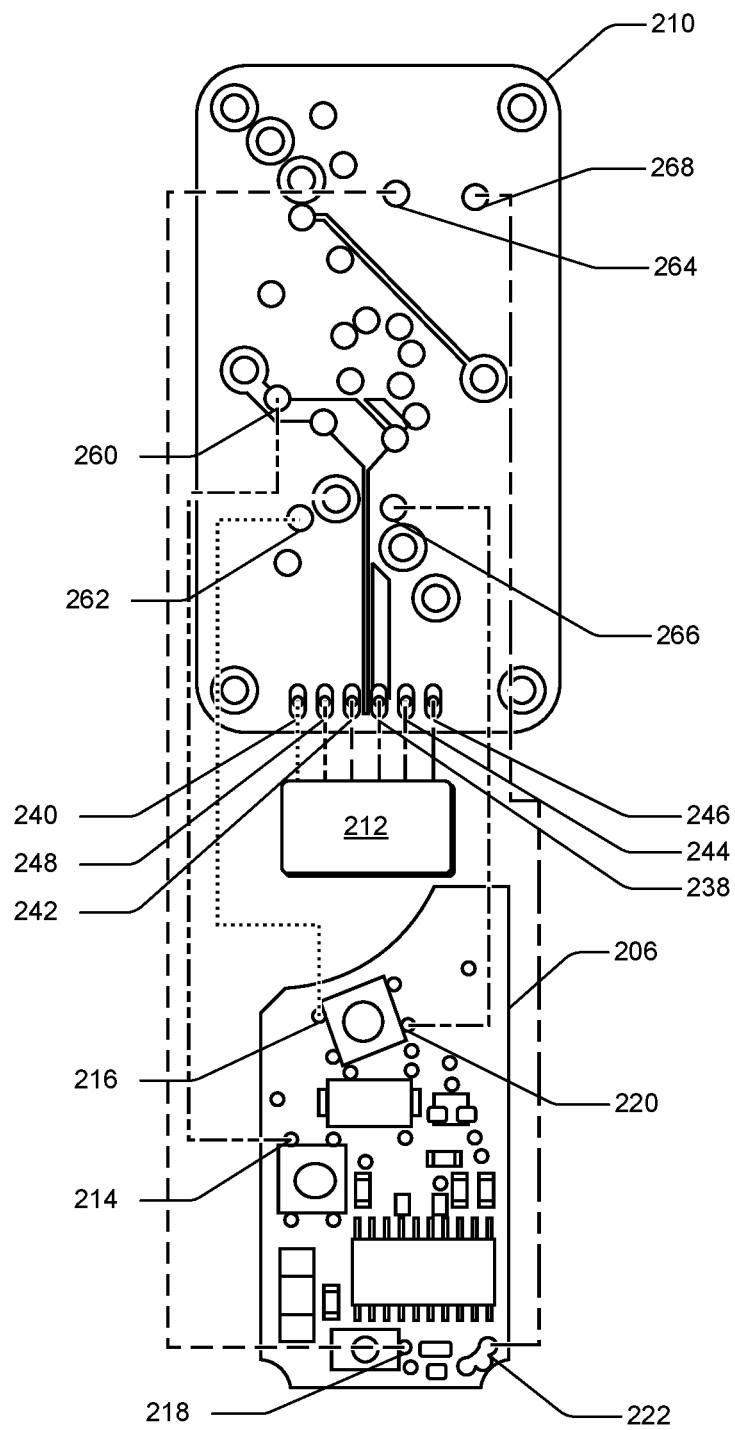
FIG. 2D illustrates an example circuit board that is paired with an additional third-party circuit board from the group of third-party circuit boards, where the example circuit board is configurable to form a plurality of connections with the additional third-party circuit board via one or more additional connection points different from the one or more connection points.
Figure 2E:
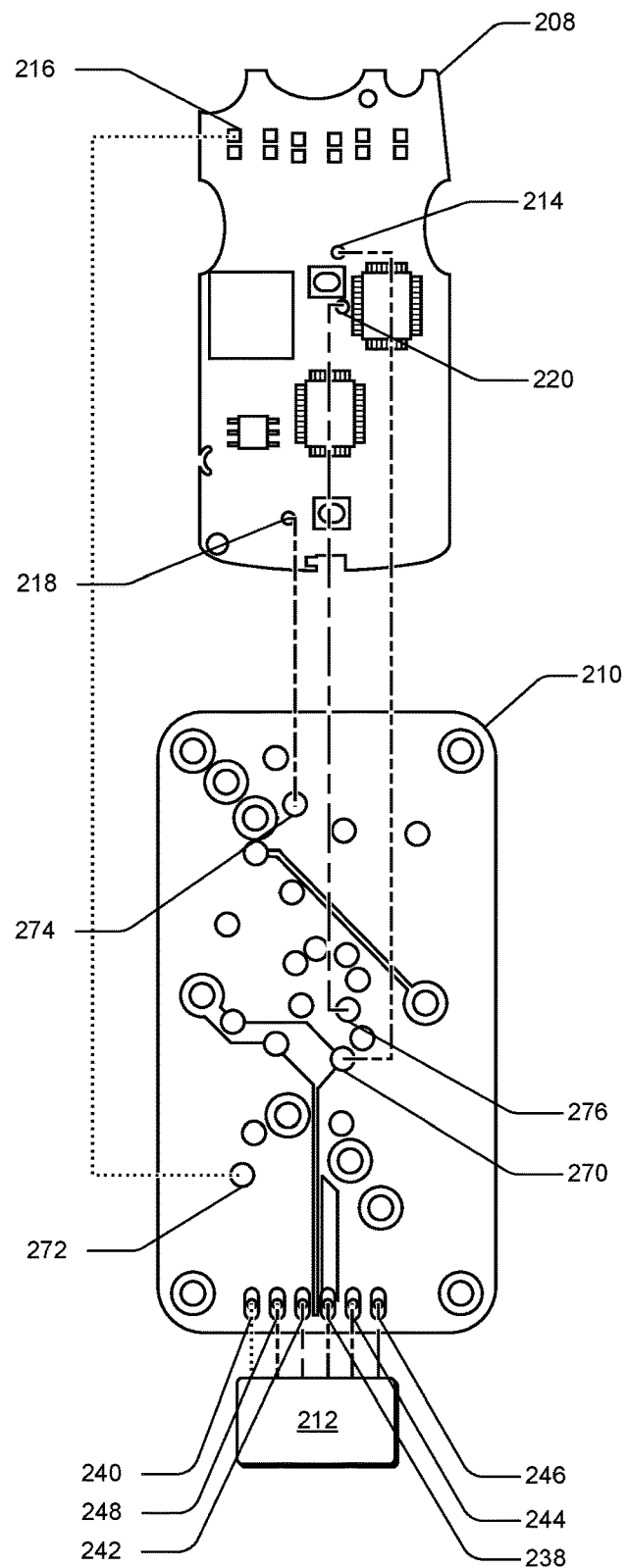
FIG. 2E illustrates an example circuit board that is paired with a final third-party circuit board from the group of third-party circuit boards, where the example circuit board is configurable to form a plurality of connections with a plurality of interface points associated with the final third-party circuit board.

FIGS. 2D and 2E respectively illustrate a third circuit board 206 and a fourth circuit board 208 that are selected to combine with the configurable circuit board 210 in addition to the first circuit board 202 and the second circuit board 204. A third set of configurable connection points of the configurable circuit board 210 can comprise configurable connection points 260-268 that are configured to align with interaction points 214-222 on the third circuit board. Additionally, a fourth set of configurable connection points can comprise configurable connection points 270-278 that are configured to align with interaction points 214-220 on the fourth circuit board. Further, the configurable connection points 260-268 and the configurable connection points 270-278 can route connection through the generic interface leads 238-248.

In some embodiments of FIGS. 2A-2E, the interaction points can be associated with individual controls and/or features that are shared between the first circuit board 202, the second circuit board 204, the third circuit board 206, and the fourth circuit board 208 (or any other number or type of circuit boards). In particular, regardless of the position of an interaction point on a particular third-party circuit board (i.e., the first circuit board 202, the second circuit board 204, etc.), a first interaction point 214 can be utilized to activate, trigger, select, or otherwise interact with a first control and/or feature of the third-party circuit boards. For example, where the third-party circuit boards are obtained from key fobs associated with vehicles, the first control and/or feature can be an unlock feature. Accordingly, the first interaction point on each of the third-party circuit boards is associated with a trigger for the unlock feature of the vehicle, via the configurable circuit board 210. Similarly, each additional control, feature, ground, and/or power source of the third-party circuit boards can be associated with a specific interaction point of the interaction points 214-224.

In some embodiments of FIGS. 2A-2E, the generic interface 212 comprises the generic interface leads 238-248. Additionally, the generic interface leads can be individually associated with the configurable connection points. As noted above, where the configurable circuit board 210 is paired with the first circuit board 202, the first set of configurable connection points can be located such that configurable connection points 226-236 align with the interaction points 214-224 on the first circuit board 202. Accordingly, configurable connection point 226 can form a connection with interaction point 214 via a connector (e.g., a straight pin, a spring-loaded pin, a soldered wire, etc.), configurable connection point 228 can form a connection with interaction point 216, and configurable connection points 230-236 can similarly form connections with interaction points 218-224. Additionally, configurable connection point 226 can be connected with and route the connection from interaction point 214 through generic interface lead 238, configurable connection point 228 can be connected with and route the connection from interaction point 216 through generic interface lead 240, and configurable connection points 230-236 can similarly be connected with and route the connections from interaction points 218-224 through generic interface leads 242-248.

In some additional embodiments of FIGS. 2A-2E, the configurable circuit board 210 can be paired with the second circuit board 204 such that the second set of configurable connection points 250-258 aligns with the interaction points 214-222 on the second circuit board 204. Similar to the pairing between the first circuit board 202 and the configurable circuit board 210, configurable connection point 250 can form a connection with interaction point 214 via a connector, configurable connection point 252 can form a connection with interaction point 216, and configurable connection points 254-258 can similarly form connections with interaction points 218-222. Additionally, configurable connection point 250 can be connected with and route the connection from interaction point 214 through generic interface lead 238, configurable connection point 252 can be connected with and route the connection from interaction point 216 through generic interface lead 240, and configurable connection points 254-258 can similarly be connected with and route the connections from interaction points 218-222 through generic interface leads 242-248.

In some further embodiments of FIGS. 2A-2E, the configurable circuit board 210 can be paired with the third circuit board 206 and the fourth circuit board 208 such that the third set of configurable connection points 260-268 aligns with the interaction points 214-222 on the third circuit board 206 and the fourth set of configurable connection points 270-276 aligns with the interaction points 214-220 on the fourth circuit board 208. Additionally, and similar to the connections described above, connections can be formed to route signals and/or interactions between the interaction points 214-222 on the third circuit board 206, the configurable connection points 260-268, and the generic interface leads 238-246. Similarly, connections can be formed to route signals and/or interactions between the interaction points 214-220 on the fourth circuit board 208, the configurable connection points 270-276, and the generic interface leads 238-244. In at least one embodiment, a configurable connection point can be included in a plurality of configurable connection point sets that are associated with different third-party circuit boards.

In some embodiments of FIGS. 2A-2E, individual generic interface leads can be connected with one or more configurable connection points, wherein each of the configurable connection points is associated with a third-party circuit board. In at least one embodiment, each of the configurable connection points associated with the generic interface lead can be associated with a different third-party circuit board from other configurable connection points. For example, generic interface lead 238 can be connected to configurable connection point 226 for the first circuit board 202, configurable connection point 250 for the second circuit board 204, configurable connection point 260 for the third circuit board 206, and configurable connection point 270 for the fourth circuit board 208. Accordingly, interactions with the generic interface lead 238 can be received from and transferred to configurable connection points 226, 250, 260, and 270. It should be noted that while the generic interface leads can be connected to multiple configurable connection points, a generic interface lead can be connected to a single configurable connection point (i.e., generic interface lead 248 and interaction point 224 of the first circuit board 202) where there is a control or feature that is specific to a single third-party circuit board. In at least one additional embodiment.

Figure 3A:
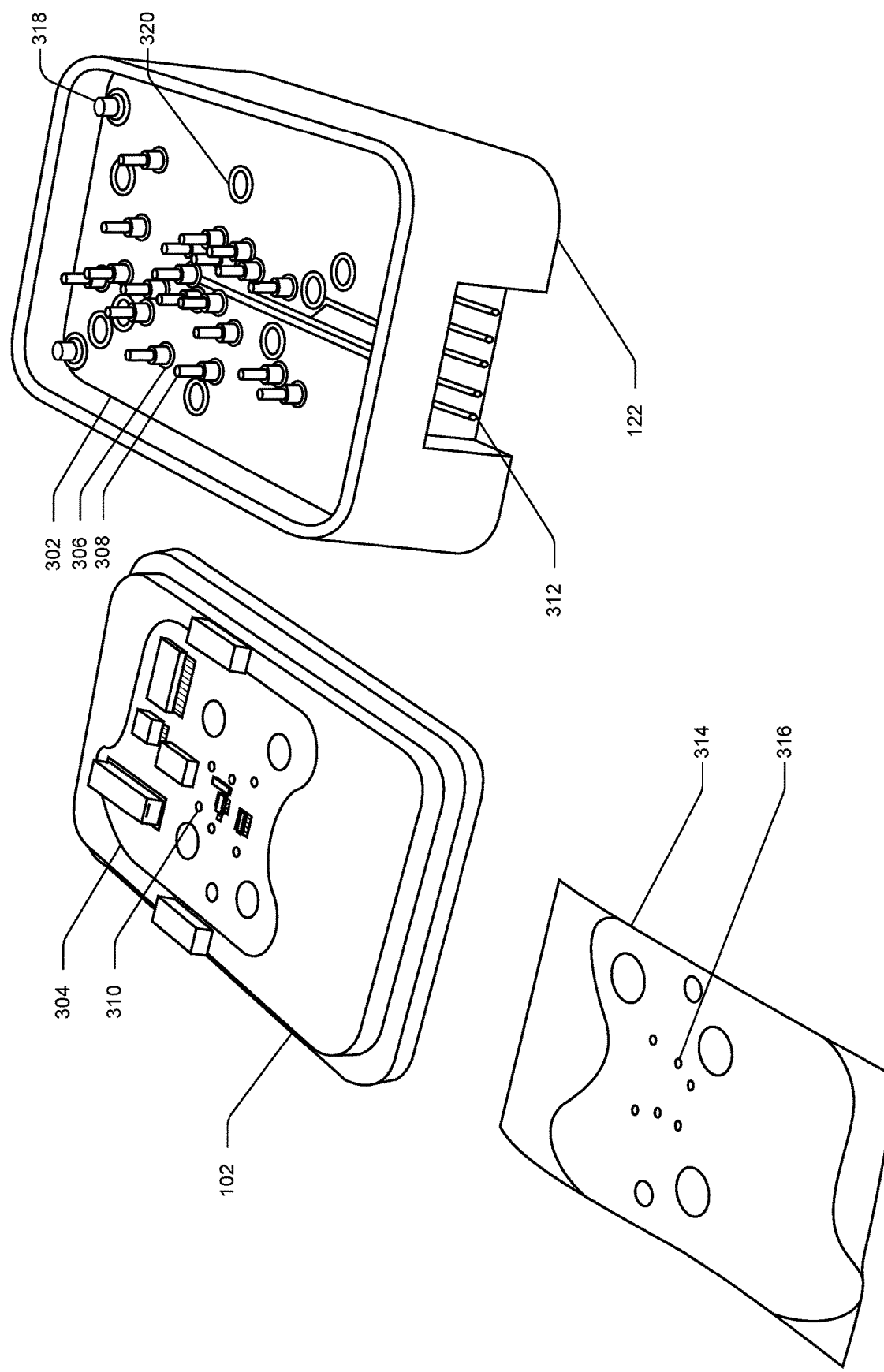
FIG. 3A illustrates an example device configured to abstract one or more features of third-party circuit boards that can be assembled from a fabricated lid, a mask, and a generic base and contains the third-party circuit board combined with a configurable circuit board.
Figure 3B:
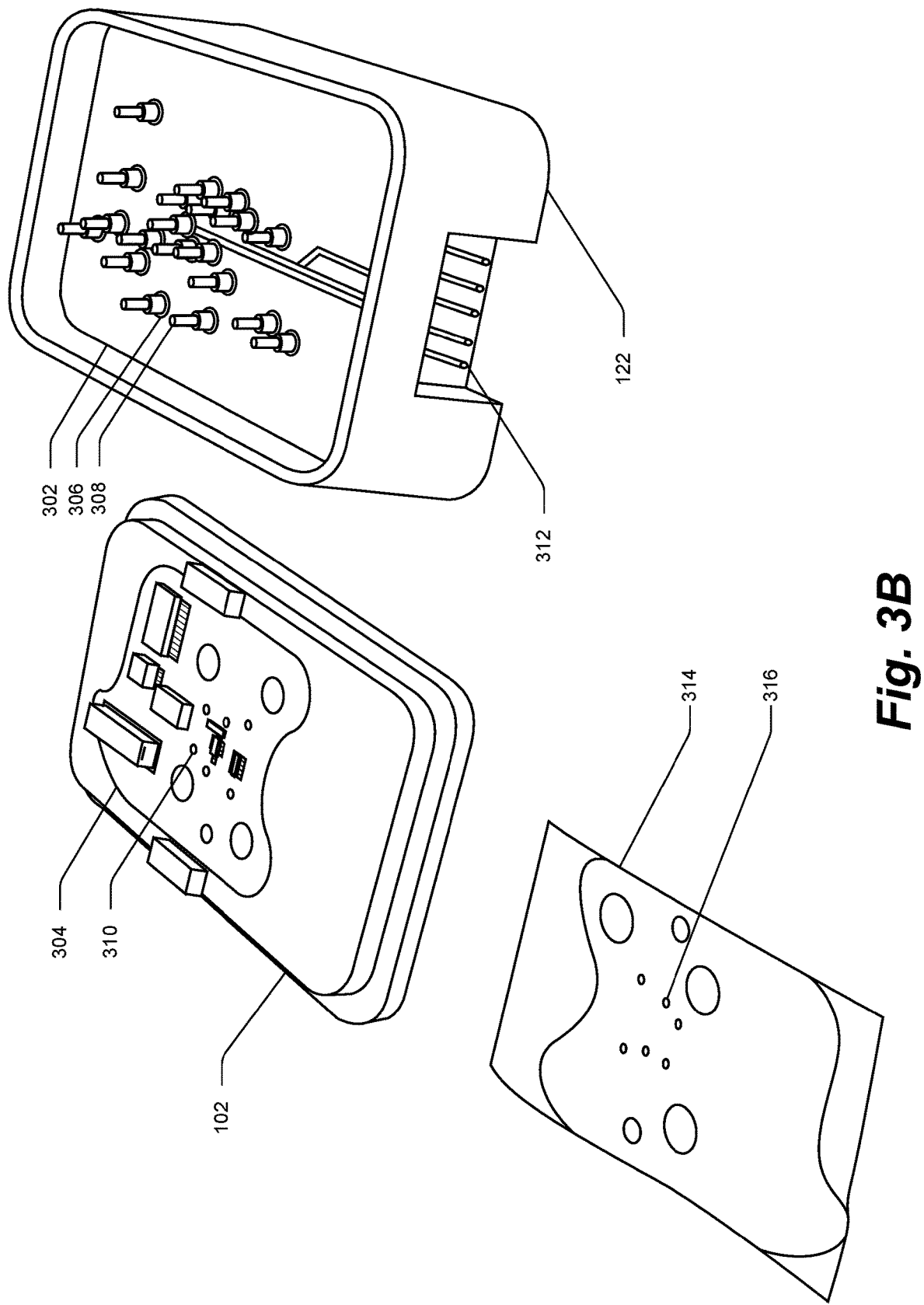
FIG. 3B illustrates an example device configured to abstract one or more features of third-party circuit boards that can be assembled from a fabricated lid, the third-party circuit board installed in the fabricated lid, a mask, and a generic base that contains a configurable circuit board.

FIG. 3A illustrates an example device configured to abstract one or more features of third-party circuit boards that can be assembled from a fabricated lid, a mask, and a generic base and contains the third-party circuit board combined with a configurable circuit board. Similarly, FIG. 3B illustrates an example device configured to abstract one or more features of third-party circuit boards that can be assembled from a fabricated lid, the third-party circuit board installed in the fabricated lid, a mask, and a generic base that contains a configurable circuit board. In some embodiments of FIGS. 3A and 3B, a configurable circuit board 302 and a third-party circuit board 304 can be inserted into a generic case 122 and a fabricated lid 102. Additionally, a plurality of configurable connection points 306 can be populated (i.e., filled, configured, connected, etc.) with a plurality of connectors 308 (i.e., linear pins, spring-loaded pins, soldered leads, etc.). In at least one embodiment, the plurality of configurable connection points 306 can include one or more sets of configurable connection points associated with one or more third-party circuit boards. In at least one additional embodiment, the plurality of configurable connection points 306 can include substantially all of the configurable connection points associated with the configurable circuit board 302. In at least one further embodiment, multiple sets of configurable connection points of the plurality of configurable connection points 306 can be populated with the connectors 308.

In some embodiments of FIGS. 3A and 3B, one or more interface points 310 can be associated with a set of the connectors 308 and connected to a set of the configurable connection points 306. The connection to the one or more interface points 310 can further be routed through the physical interface 312 (i.e., generic interface). As noted above, the physical interface 312 can be utilized to abstract the features of the third-party circuit board 304 and provide access to the features to external user devices. In at least one embodiment, the combination of the generic case base 122 and the fabricated lid 102 can be combined, containing the configurable circuit board 302 and the third-party circuit board 304, and inserted into and/or connected with an additional device. The additional device can include transceivers for sending and receiving signals (cellular, Bluetooth®, Wi-Fi, etc.) that are associated with the features of the third-party circuit board 304, a power source for the configurable circuit board 302 and the third-party circuit board 304, security mechanisms, and/or other additional features. In at least one additional embodiment, the physical interface 312 can couple with a port and/or connection associated with a vehicle, mechanism, or other mechanical device that is associated with the third-party circuit board 304. For example, the third-party circuit board 304 can be associated with an automobile that includes an OBD-II and/or other diagnostics port. Additionally, the physical interface 312 can connect with the OBD-II port for a power source. It should be noted that while utilizing the OBD-II port is for power is discussed, it is considered that the physical interface 312 connects to a different port associated with a vehicle, a mechanism, or other mechanical device to connect a network or cloud service, receive additional information, and/or access other features associated with the controls/features of the third-party circuit board 304.

In some embodiments of FIGS. 3A and 3B, an insulating film 314 is utilized as a mask that can be inserted between the one or more interface points 310 and the plurality of connectors 308. In particular, the number of connectors 308 affixed to the configurable circuit board 302 can exceed the number of interface points 310 on the third-party circuit board 304. Accordingly, to ensure that a proper connection is formed between the one or more interface points 310 and the plurality of connectors 308, the insulating film 314 can be utilized to prevent unnecessary or incorrect connections from forming between the configurable circuit board 302 and the third-party circuit board 304. For example, a first set of connectors (i.e., a subset of the plurality of connectors 308) can be associated with the one or more interface points 310 of the third-party circuit board 304. Additionally, a second set of connectors (i.e., a second subset of the plurality of connectors 308) can be associated with one or more additional interface points of an additional third-party circuit board. Accordingly, connections between the second set of connectors and the third-party circuit board 304 (i.e., between the third-party circuit board itself, the one or more interface points 310, or alternate interface points associated with the third-party circuit board 304) would be unnecessary or incorrect. Further, extraneous connections may cause signal conflicts where multiple interface points of the third-party circuit board 304 receive conflicting or overlapping feature triggers due to the unnecessary or incorrect connections. Accordingly, the insulating film 314 can be configured and utilized to mask the second set of configurable connection points and prevent the unnecessary or incorrect connections.

In at least one embodiment, the insulating film 314 can permit a first set of the connectors 308 to form a connection with the one or more interface points 310, wherein the first set of the connectors 308 is associated with the third-party circuit board 304. In at least one additional embodiment, the insulating film 314 can comprise one or more signal transfer points 316. In particular, the one or more signal transfer points 316 can align with the one or more interface points 310 and permit the first set of the connectors 308 to connect with the third-party circuit board 304. For example, the one or more signal transfer points 316 can be a set of holes in the insulating film that allow the first set of the connectors 308 to contact the one or more interaction points 310, areas of conductive film that permit signals to be transferred between the first set of the connectors 308 and the one or more interface points 310, or other means of selectively connecting the first set of the connectors 308 and the one or more interface points 310.

In some embodiments of FIG. 3A, the device can be assembled such that one or more standoffs 318 can support the third-party circuit board 304. The one or more standoffs 318 can extend from the generic case 122, through one or more standoff holes 320. As discussed with respect to FIG. 1, one or more configurable circuit board standoffs (i.e., the one or more standoffs 318) can be utilized to secure the configurable circuit board 302 against lateral movement within the generic case 122 (e.g., one or more standoff holes 320 in the corners of the configurable circuit board 302 can receive the one or more standoffs 318 to secure the configurable circuit board 302). Additionally, the one or more standoff holes 320 in the configurable circuit board 302 can be located such that the one or more standoffs 318 can support the configurable circuit board 302 and the third-party circuit board 304. The one or more standoffs 318 can extend through the one or more standoff holes 320 positioned such that the one or more standoffs 318 can prevent movement of the third-party circuit board 304 and the configurable circuit board 302 within the fabricated lid 102 and the generic case 122 respectively. Alternatively, the one or more standoffs 318 can support the configurable circuit board 302 while one or more additional standoffs extend through the one or more standoff holes 320 to support the third-party circuit board 304. In at least one embodiment, a set of the one or more standoff holes 320 can be specific to an individual third-party circuit board 304. In particular, the set of the one or more standoff holes 320 can support the individual third-party circuit board 304 in a position such that the one or more interaction points 310 are aligned with the associated configurable connection points 306 on the configurable circuit board 302. Additionally, the set of the one or more standoff holes 320 can secure the individual third-party circuit board 304 such that the one or more signal transfer points 316 on the insulating film 314 are aligned with the one or more interaction points 310. Further, the one or more standoff holes 320 can including multiple sets of standoff holes 320 that are associated with multiple third-party circuit boards 304.

In some embodiments of FIG. 3B, the configurable circuit board 302 and the third-party circuit board 304 can be secured within the generic case 122 and the fabricated lid 102. In particular, the configurable circuit board 302 can be secured within the generic case 122 against lateral movement by a socket configured to receive the configurable circuit board 302. Similarly, the fabricated lid 102 can be configured to receive the third-party circuit board 304 in a manner described with respect to FIG. 1. It should be noted that one or more springs can be utilized to ensure proper connections between the one or more configurable connection points 306, the one or more connectors 308, and the one or more interaction points 310. The one or more springs can be installed between a bottom surface of the configurable circuit board 302 and the generic case 122. The one or more springs can be configured to apply a force to the configurable circuit board 302 that maintains the connection between the configurable circuit board 302 and the third-party circuit board 304. Alternatively, in at least one embodiment, the one or more springs can be installed between the third-party circuit board 304 and the fabricated lid 102. In particular, the one or more springs can apply a force to the third-party circuit board 304 that ensures the connection between the configurable circuit board 302 and the third-party circuit board 304. In at least one additional embodiment, the connectors 308 can be spring-loaded connectors that extend and retract to maintain the connection between the configurable circuit board 302 and the third-party circuit board 304 secured by their respective sockets and/or holders.

Figure 4:
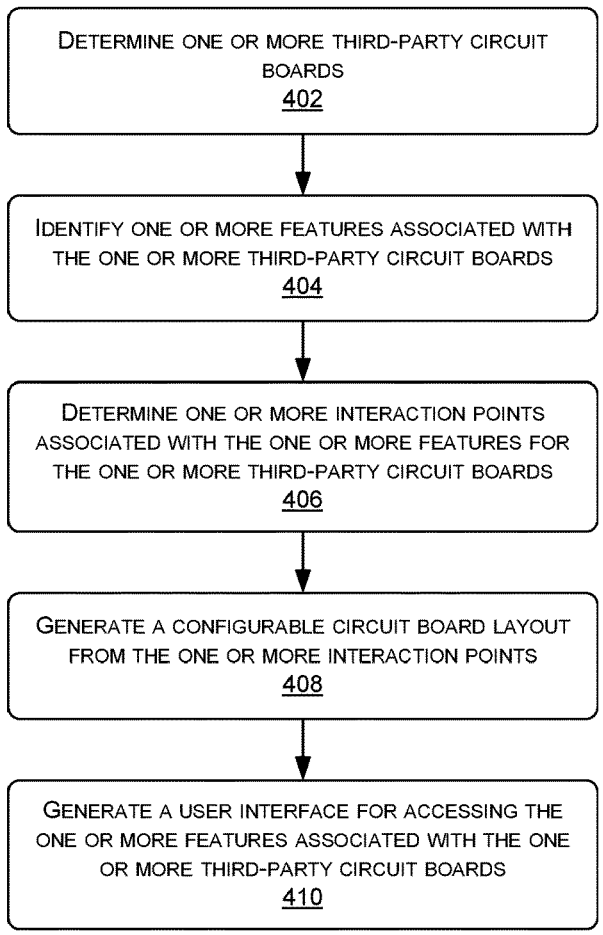
FIG. 4 illustrates an example method for identifying features of interest associated with a third-party circuit board and generating a configurable circuit board for abstracting one or more features of one or more third-party circuit boards to a generic interface.

FIG. 4 illustrates an example method 400 for generating a configurable circuit board for abstracting one or more features of one or more third-party circuit boards to a generic interface.

At block 402, one or more third-party circuit boards can be determined. In some embodiments, the one or more third-party circuit boards can be associated with a class of features and/or controls that can be shared the one or more third-party circuit boards, specific to a subset of the third-party circuit boards, or unique to a third-party circuit board. For example, interaction points 214-220 are common to third-party circuit boards 202-208, interaction point 222 is specific to third-party circuit boards 202-206, and interaction point 224 is unique to third-party circuit board 202. In at least one embodiment, the one or more third-party circuit boards can be determined based on the features common to the one or more third-party circuit boards. In at least one additional embodiment, the one or more third-party circuit boards can be determined based on the shared mechanisms and/or operations of a class of vehicles (i.e., automobiles, UAVs, etc.) and other mechanical goods (i.e., remote controlled devices, automated doors, etc.).

At block 404, one or more features of the third-party circuit boards can be identified. In some embodiments, the one or more features can be controls that are associated with a vehicle or other mechanical good. In at least one embodiment, and as noted above, the one or more features can include an unlock command, a lock command, an alarm trigger, a remote-start command, and/or other features associated with a vehicle. In at least one additional embodiment, the one or more features can include an acceleration control, a deacceleration control, a steering control, a release control (i.e., a control that causes a mechanical device to release a secured package or good), and other controls associated with a vehicle and/or remote-controlled device. In at least one further embodiment, the one or more features can include a location specification feature, a deadline feature (e.g., a specified time by which a delivery is to be completed by), a timeframe feature (e.g., an amount of time for completing a delivery), and other features associated with a vehicle and/or automated device. It should be noted that while the above features are discussed in a manner that relates to a single task, the third-party circuit boards can include features and/or controls beyond the above task-specific features. Accordingly, the one or more features identified at block 404 can include any feature triggerable by the one or more third-party circuit boards.

At block 406, one or more interaction points associated with the one or more features can be determined for the one or more third-party circuit boards. In some embodiments, the one or more features of the third-party circuit boards can be associated with points, areas, and/or locations that are capable of triggering and/or activating the one or more features. Upon identifying the one or more features associated with the third-party circuit board, one or more points of interest can be identified for each of the one or more features. Additionally, each of the one or more points of interest can be tested to determine whether the points of interest are large enough to form a connection with a connector, determine an activation threshold and/or a signal threshold (i.e., a minimum voltage and/or signal amplitude required to trigger a control and/or feature associated with each point of interest) for the one or more points of interest, to determine whether the configurable circuit board can satisfy the signal threshold (i.e., the activation threshold), determine whether the point of interest overlaps with a second point of interest associated with a second third-party circuit board, and an error metric associated with the maintenance of a connection with the point of interest. Further, once the signal threshold is determined and the configurable circuit board satisfies the signal threshold, an interaction point can be selected for a feature and/or control from the one or more points of interest. In other words, the third-party circuit board can comprise one or more interaction points that are selected to enable activation and/or utilization of the one or more features by the configurable circuit board. In at least one embodiment, the one or more interaction points can be test points, debug points, or other quality assurance points that can be utilized to transmit and receive signals associated with the one or more features. In at least one additional embodiment, the one or more interaction points can be contacts for physical triggers (i.e., buttons) and/or sensors associated with the one or more third-party circuit boards.

In some additional embodiments, an elevation of the interaction points can be determined while identifying the one or more interaction points. In particular, a subset of the one or more interaction points can be located on one or more active components that protrude and/or extend from the surface of the third-party circuit board. For example, a processor can be embedded in the third-party circuit board such that a surface of the processor is elevated from the third-party circuit board. Additionally, the processor can be associated with memory containing instructions for transmitting a signal to an associated device, wherein an electrical contact on the processor can cause the signal to be transmitted by one or more associated transceivers.

In some further embodiments, the one or more interaction points can be selected based on their position on the third-party circuit board and whether they overlap with existing connection points on the configurable circuit board. In particular, the one or more interaction points can be selected from a plurality of points of interest based at least on whether a point of interest can be aligned with a connection point (i.e., an available connection point) on the configurable circuit board that does not conflict with other connection points on the configurable circuit board. For example, the third-party circuit board can include points of interest that are associated with a control provided by the third-party circuit board. Additionally, the configurable circuit board can include one or more connection points associated with one or more additional third-party circuit boards. One or more points of interest of the plurality of points of interest can be determined to require one or more new connection points that would be located where and/or overlap with the one or more connection points on the configurable circuit board (i.e., the new connection point would conflict with the one or more connection points). Accordingly, a new interaction point can be selected from the plurality of points of interest based in part on a lack of conflict with the one or more connection points associated with the configurable circuit board (i.e., the new interaction point is associated with an available connection point).

In at least one embodiment, the new interaction point can be selected for the third-party circuit board such that the new interaction point can connect with a connection point associated with an additional third-party circuit board. In particular, the new interaction point can be selected to connect with the connection point where the connection point is associated with a control of the additional third-party circuit board that is also provided by the third-party circuit board. Additionally, the connection point can connect with and is associated with the control triggered by the new interaction point of the third-party circuit board and an interaction point of the additional third-party circuit board (i.e., the new interaction point and the interaction point can both trigger the control for the respective third-party circuit boards).

At block 408, a configurable circuit board layout can be generated from the one or more interaction points associated with the third-party circuit boards. In some embodiments, the one or more third-party circuit boards are individually associated with unique interaction point layouts. Further, the interaction point layouts can be arranged to fit within the configurable circuit board. Additionally, the interaction point layouts can be implemented as a plurality of configurable connection points that comprise the configurable circuit board. Accordingly, the one or more interaction points of the third-party circuit boards can be aligned with an associated set of configurable connection points on the configurable circuit board.

In some additional embodiments, the configurable circuit board can be organized such that the configurable connection points are not aligned with or blocked by protruding components of the third-party circuit boards. In particular, some embodiments of this disclosure include configurable circuit boards having configurable connection points that are fully populated by connectors. The configurable connection points can be fully populated for ease of assembly and increased throughput when processing a large volume of third-party circuit boards. Additionally, the fully populated configurable connection points permit a fabricated lid with an inserted third-party circuit board to be attached to, combined with, or otherwise associated with a generic case that contains the configurable circuit board. In at least one embodiment, the fabricated lid can further include an insulated film that masks one or more connectors that are not associated with the third-party circuit board while permitting the associated connectors to contact the interaction points.

In at least one embodiment, individual configurable connection points can be included by multiple layouts associated with the one or more third-party circuit boards. In at least one embodiment, the shared configurable connection points can send and receive signals related to the same feature that is provided by the associated third-party circuit boards. Additionally, an indication or other means of identifying when individual third-party circuit boards are connected with the shared configurable connection points to determine whether any signaling changes are necessary (e.g., a first third-party circuit board is associated with a first signaling threshold while a second third-party circuit board is associated with a second signaling threshold) can be utilized to distinguish between the third-party circuit boards.

In at least one additional embodiment, individual configurable connection points are arranged such that each configurable connection point is only utilized by a single interaction point layout associated with a single type or model of third-party circuit board. In particular, the configurable connection points can be arranged to avoid overlap between interaction point layouts to avoid conflict between the signals transmitted via the connectors. Accordingly, the configurable connection points can be arranged on the configurable circuit board such that substantially all of the interaction point layout, for each third-party circuit board, can be projected onto the configurable circuit board as configurable connection points while maintaining sufficient distance between the configurable connection points to avoid signal conflict and/or overlap caused by additional configurable connection points forming connections with and transmitting signals to third-party circuit boards that the additional configurable connection points are not associated with. For example, one or more controls can be provided by a first third-party circuit board and a second third-party circuit board. Additionally, the first third-party circuit board includes one or more first interaction points associated with a first set of configurable connection points and the second third-party circuit board includes one or more second interaction points associated with a second set of configurable connection points. Accordingly, a configurable circuit board can be generated such that the first set of configurable connection points does not form connections with the second third-party circuit board and the second set of configurable connection points does not form connections with the first third-party circuit board. Due to the first third-party circuit board and the second third-party circuit board interaction points potentially requiring different signals to trigger controls and/or features of the third-party circuit boards, permitting overlap or unintended connections between unrelated configurable connection points and third-party circuit boards can result in conflicting signals or erroneous triggering of controls and/or features.

In some further embodiments, the configurable circuit board layout can be generated from the one or more interaction points associated with the one or more third-party circuit boards based on at least one of the position of the one or more interaction points, the layout of the one or more interaction points on individual third-party circuit boards, the features triggered by the one or more interaction points, and other factors that give priority to the one or more interaction points over other points of interest on the one or more third-party circuit boards. As discussed at block 406, the one or more interaction points associated with the third-party circuit boards can be selected based at least in part on the position of the one or more interaction points relative to other interaction points and points of interest associated with the third-party circuit board and/or one or more additional third-party circuit boards. Similarly, the one or more interaction points can be selected based on the features triggered by the points of interest (i.e., a point of interest can trigger multiple features), the activation/signal threshold, the verification that the points of interest, the ability to read from/write to the third-party circuit board via the points of interest, and other factors. Accordingly, the configurable circuit board layout can be generated to utilize the one or more interaction points determined to provide access to the one or more features of the one or more third-party circuit boards and prioritize the one or more interaction points that provide access to multiple features, read from the one or more third-party circuit boards, write to the one or more third-party circuit boards, trigger features associated with other points of interest, and avoid conflict with other connection point/interaction point combinations.

Figure 5:
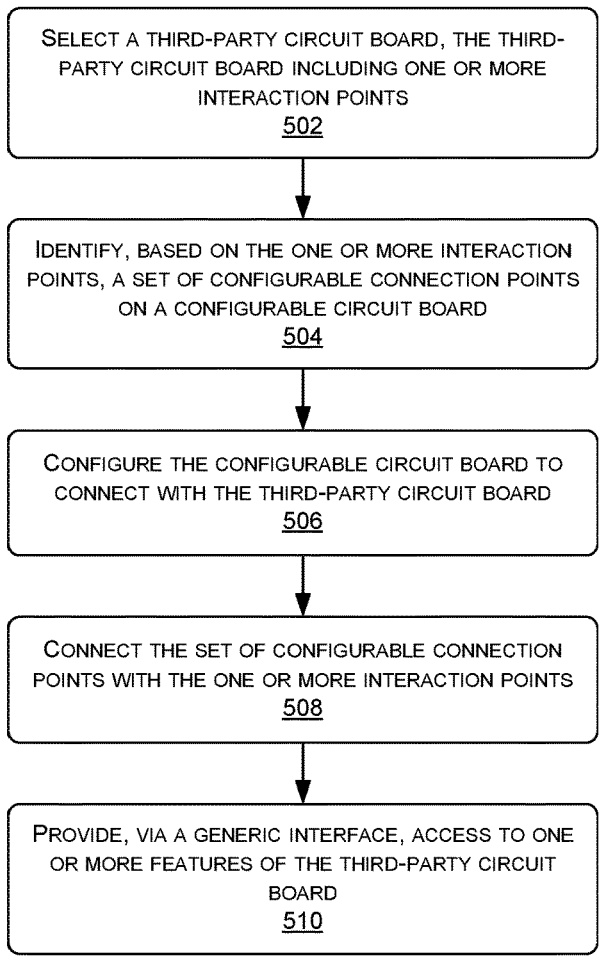
FIG. 5 illustrates an example method for configuring a configurable circuit board and combining the configurable circuit board with a third-party circuit board to abstract and provide access to one or more features of the third-party circuit board.

At block 410, a user interface for accessing the one or more features associated with the third-party circuit boards can be generated. In some embodiments, the configurable connection points can be connected with a generic interface and route signals exchanged with the third-party circuit board to and through the generic interface. In at least one embodiment, the configurable connection points associated with a single feature of the third-party circuit boards can be routed through a single pin, contact, lead, or other connector of the generic interface. Additionally, the generic interface can be connected to an additional system that can provide power, transceiver capability, and additional functions that may not be incorporated into the configurable circuit board. Accordingly, the signals that are exchanged with the third-party circuit board can be triggered by and reported to a user interface that is generated based on the one or more features associated with the third-party circuit boards. Further, the user interface can include selectable triggers for the one or more features that become available once the user interface has been assigned a third-party circuit board FIG. 5 illustrates an example method 500 for configuring a configurable circuit board and combining the configurable circuit board with a third-party circuit board and provide access to one or more features of the third-party circuit board. At block 502, a third-party circuit board including one or more interaction points can be selected for integration into a device. In some embodiments, the third-party circuit board can be associated with a fabricated lid designed to secure the third-party circuit board within a device as illustrated by FIGS. 1, 3A, and 3B.

At block 504, a set of configurable connection points can be identified based on the one or more interaction points associated with the third-party circuit board. As noted above with respect to FIG. 4, the third-party circuit board can include one or more interaction points that are organized in an interaction point layout. Accordingly, the set of configurable connection points can be identified either by association with the third-party circuit board (e.g., a first set of configurable connection points are associated with all 2019 Ford F-150s®) or based on a layout of the configurable connection points that matches the layout of the interaction points.

At block 506, the configurable circuit board can be configured to combine connect, and/or otherwise mate with the third-party circuit board. In some embodiments, the set of configurable connection points can be populated with connectors. In particular, the connectors can be linear pins, spring loaded pins, soldered physical connections, and other connections capable of transmitting signals between the third-party circuit board and the configurable circuit board. Additionally, specific connectors can be utilized based on variations in the third-party circuit board. In at least one embodiment, spring-loaded pins can be utilized to contact interaction points that are associated with elevation variations to ensure that the connectors maintain effective contact with the interaction points.

In some additional embodiments, the configurable circuit board can be preconfigured such that the set of configurable connection points is preemptively populated with the connectors. In at least one embodiment, the configurable circuit board is preconfigured such that all configurable connection points on the configurable circuit board are fully populated with the connectors. Alternatively, the set of configurable connection points can be populated with the connectors and the third-party circuit board that matches the configurable connection is selected at block 502.

At block 508, the set of configurable connection points is connected, combined, or otherwise associated with the one or more interaction points such that signals can be exchanged between the configurable circuit board and the third-party circuit board. In some embodiments, the fabricated lid that secures the third-party circuit board and the generic case that secures the configurable circuit board can be combined such that the connectors affixed and/or attached to the set of configurable connection points are aligned with the interaction points. Additionally, one or more standoffs and one or more standoff springs can be utilized to ensure proper contact between the interaction points and the connectors (e.g., the combination of the fabricated lid and generic base compresses the standoff springs that continuously apply a force to the configurable circuit board such that the connectors are held in contact with the interaction points). Further, spring-loaded connectors can be utilized to ensure that contact is maintained with the interaction point, wherein the spring-loaded connectors are configured to extend away from the configurable circuit board and/or towards the interaction points.

In some additional embodiments, where the configurable circuit board is fully or substantially populated with connectors, an insulating film can be inserted between the third-party circuit board and the configurable circuit board. As noted above, with respect to FIGS. 3A and 3B, the insulating film can include one or more signal transfer points that allow for signal exchange between the interaction points and the connectors. Due to the insulating film masking and/or preventing unwanted contact between excess configurable connection points and the interaction points while maintaining contact with the set of configurable connection points, the process of combining the third-party circuit board with the configurable circuit board can be simplified. In at least one embodiment, a fully populated configurable circuit board and a third-party circuit board can be obtained. Additionally, an insulating film can be selected based on a layout of interaction points identified from the third-party circuit board. Further, a fabricated lid can be combined with the third-party circuit board and a generic case combined with the configurable circuit board. Finally, the insulating film can be placed to mask unassociated connectors, the set of connectors associated with the third-party circuit board and the interaction points to be aligned, and the two parts of the device combined to contact the interaction points with the connectors.

At block 510, one or more features (i.e., controls) of the third-party circuit board can be accessed via a generic interface. In some embodiments, the one or more features can be provided via transmissions received from and sent to transceivers that are connected to the generic interface. Additionally, the third-party circuit board and the configurable circuit board can utilize the generic interface to connect to a power source. Further, the generic interface can permit a device to access the one or more feature associated with the third-party circuit board via a wired or wireless connection. It should be noted that the device can be any suitable computing device configured to communicate over a wireless and/or wireline network, including, without limitation, a mobile phone (e.g., a smart phone), a tablet computer, a laptop computer, a portable digital assistant (PDA), a wearable computer (e.g., electronic/smart glasses, a smart watch, fitness trackers, etc.), a game console, a network digital camera, a global positioning system (GPS) device, and/or other similar devices. Although this description can apply to "mobile" or "wireless" devices (e.g., configured to be carried and moved around), it is to be appreciated that the device can include various types of communication devices that are generally stationary as well, such as desktop computers and the like. In this sense, the terms "communication device," "wireless device," "wireline device," "mobile device," "computing device," "terminal," "user equipment," and "user device" may be used interchangeably to describe a device capable of utilizing the features provided by the third-party circuit board. In some examples, the device can have one or more capabilities that require a connection to server for assignment, authentication, and verification purposes.

In some additional embodiments, the generic interface can provide a connection to a local device and/or an integrated device (i.e., a dongle, an access card, a small computing device, etc.) that is associated with the device and can register the device with a server. Further, the local/integrated device can include one or more transceivers, one or more processors, and memory containing instructions for assignment, verification, authentication, and communication with external devices such as the server and/or a user device assigned to the device. In at least one embodiment, a server can be utilized to assign the device housing the third-party circuit board and the configurable circuit board to a user device. Accordingly, the server can manage the assignment of delivery vehicles to drivers, wherein the device allows drivers to access functions to at least unlock and lock the vehicle via wireless and/or wired communication with the device via a user device associated with the drivers.

In some further embodiments, the generic interface can both trigger the one or more features of the third-party circuit board and read from/write to the third-party circuit board. In particular, the generic interface can receive one or more indications that include feature states (i.e., the third-party circuit board stores whether a vehicle is locked or unlocked), control pathways (i.e., identifies additional controls and/or features that can be triggered in addition to the primary feature associated with an interaction point), and other information stored by the third-party circuit board. Additionally, one or more additional indications can be transmitted from the generic interface to the third-party circuit board to change the feature states, trigger the additional controls that are associated with the interaction point via the control pathways, and write to the third-party circuit board to alter the one or more features and how the controls of the third-party circuit board function (i.e., altering control sensitivity for a UAV controlled via one or more interaction points).

Figure 6:
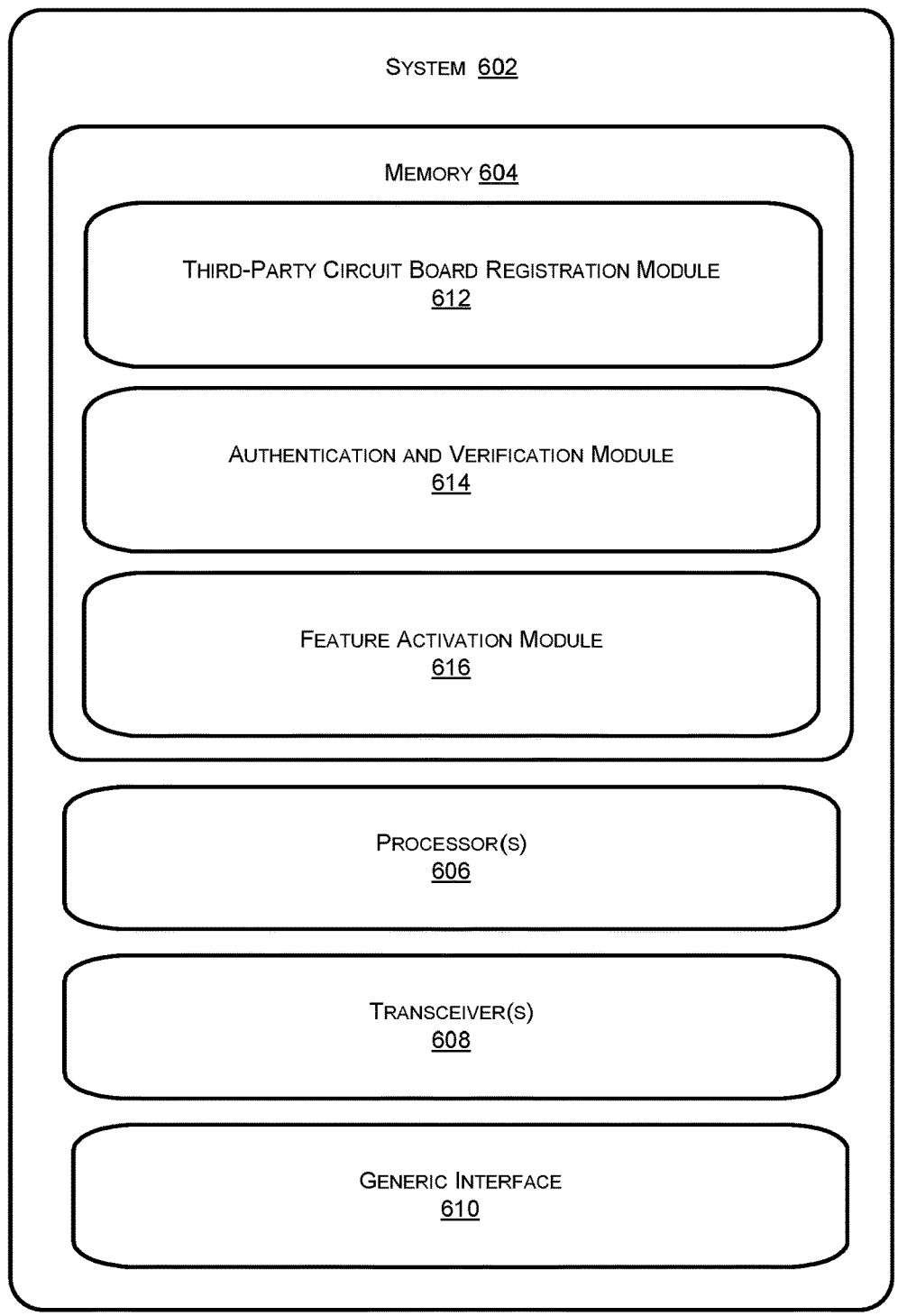
FIG. 6 illustrates a block diagram of a system that connects to a third-party circuit board and a configurable circuit board to provide wireless communication capabilities, interact with a central server, and communicate with a user device.

FIG. 6 illustrates a block diagram of a system that connects to a third-party circuit board and a configurable circuit board to provide wireless communication capabilities, interact with a central server, and communicate with a user device. In some embodiments, system 602 can interact with or correspond to any of the systems and/or devices discussed in FIGS. 1-5. As illustrated, system 602 is generally comprised of memory 604, one or more processors 606, one or more transceivers 608, and a generic interface 610.

In some embodiments, memory 604 can be volatile (such as RAM), non-volatile (such as ROM, flash memory, etc.) or some combination of the two. The memory 604 may include removable storage, non-removable storage, and other forms of computer-readable media including, but not limited to RAM, ROM, EEPROM, flash memory, other memory technologies, CD-ROM, DVDs, content-addressable memory (CAM), other optical storage, magnet storage, and any other medium which can be used to store the desired information in a format that the system 602 accesses during execution of the above methods and/or operation of the above systems/devices. The memory 604 can comprise one or more modules that cause the processors to execute one or more instructions and perform the operations discussed above. Further, the memory 604 can comprise additional modules that can be executed by the processors 606 and cause the processors 606 to perform additional operations associated with the system 602. The additional modules can comprise a third-party circuit board registration module 612, an authentication and verification module 614, and a feature activation module 616.

In some embodiments, the processors 606 can include one or more central processing units (CPUs), one or more graphics processing units (GPUs), both CPUs and GPUs, or other processing units or components known in the art.

In some embodiments, the transceivers 608 can include one or more wired or wireless transceivers. For instance, the transceivers 608 can include a network interface card, a network adapter, a LAN adapter, an address associated with a network connection, or another device permitting communications to be sent and received. Additionally, the transceivers 608 can comprise any wireless transceiver capable of engaging in wireless, radio frequency (RF) communication. Further, the transceivers 608 can also include other wireless modems, such as Wi-Fi, WiMAX, Bluetooth, and/or infrared communication modems. Accordingly, the one or more transceivers 608 can be configured to transmit and receive registration information to a central server associated with the system 602, authentication information associated with a user device, and verification information with the central server.

In some embodiments, a generic interface 610 can be associated with a device, a third-party circuit board, and/or a configurable circuit board as described with respect to FIGS. 1-5. In particular, the generic interface 610 provides a connection between one or more features of the third-party circuit board that is routed through and facilitated by the configurable circuit board. Additionally, the generic interface 610 enables the system 602 to trigger the one or more features of the third-party circuit board by the request of the user device. In at least one embodiment, the system 602 can be a device that is connected with the device that houses the third-party circuit board. Accordingly, the system 602 can provide power and communicate with the components of the device via the generic interface.

In some embodiments, and as noted above, the memory 604 includes a third-party circuit board registration module 612. The third-party circuit board registration module 612 can operate to register the features available via the device (i.e., the features associated with the third-party circuit board and accessed via the configurable circuit board). In at least one embodiment, the system 602 can be associated with the device and preemptively loaded with the features accessible via the device. In at least one additional embodiment, the system 602 can determine an identity (i.e., a model, a type, a class, etc.) of third-party circuit boards associated with the device. Regardless of the information obtained, the third-party circuit board registration module 612 can operate to report the information to the central server and register the device with the central server.

In some embodiments, memory 604 includes an authentication and verification module 614. The authentication and verification module 614 can operate to authenticate a user device that attempts to access the features associated with the third-party circuit board. Additionally, the authentication and verification module can report information regarding the user device to the central server to both authenticate the device and verify the assignment of the device to the user device.

In some embodiments, memory 604 includes a feature activation module 616. The feature activation module 616 can be configured to receive user inputs from the user device, the user inputs corresponding to one or more indications related to the features provided by the third-party circuit board. In particular, the one or more indications can cause the feature activation module to transmit one or more signals that cause the third-party circuit board to activate one or more features.

Figure 7:
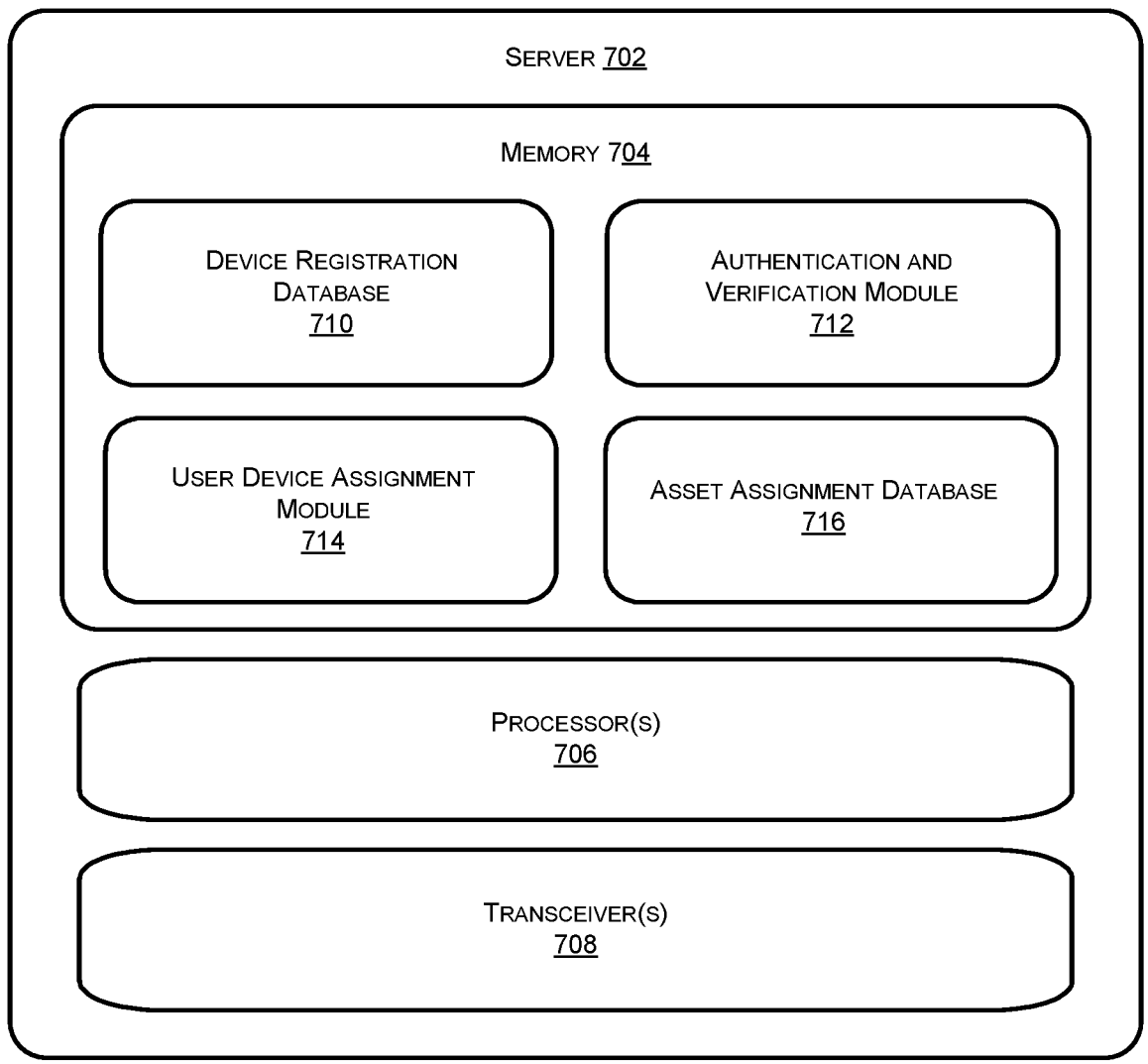
FIG. 7. illustrates a block diagram of a server that is configured to assign configured devices to a user device, provide the user device access to one or more features of a third-party circuit board, and monitor utilization of the one or more features by the user device.

FIG. 7 illustrates a block diagram of a server that is configured to assign configured devices to a user device, provide the user device access to one or more features of a third-party circuit board, and monitor utilization of the one or more features by the user device. In some embodiments, system 702 can interact with any of the systems and/or devices discussed in FIGS. 1-5. As illustrated, system 702 is generally comprised of memory 704, one or more processors 706, and one or more transceivers 708.

In some embodiments, memory 704 can be volatile (such as RAM), non-volatile (such as ROM, flash memory, etc.) or some combination of the two in the manner described with respect the memory 604. The memory 704 can be accessed by the system 702 accesses during execution of the operations described below in relation to the methods, systems, devices, and/or operations described above. The memory 704 can comprise one or more modules that cause the one or more processors 706 to execute one or more instructions and perform the operations discussed above and below. Further, the memory 704 can comprise additional modules that can be executed and/or utilized by the processors 706 and cause the processors 706 to perform additional operations associated with the system 702. The additional modules can comprise a device registration database 710, an authentication and verification module 712, a user device assignment module 714, and an asset assignment database 716.

In some embodiments, the processors 706 can include one or more central processing units (CPUs), one or more graphics processing units (GPUs), both CPUs and GPUs, or other processing units or components known in the art.

In some embodiments, the transceivers 708 can include one or more wired or wireless transceivers in a manner similar to that described above with respect to transceivers 608. Accordingly, the one or more transceivers 708 can be configured to exchange registration information with a system associated with the server 702 and a third-party circuit board, authentication information associated with a user device, verify authentication requests received from a system associated with the server 702, and otherwise communicate with related devices.

In some embodiments, and as noted above, the memory 704 includes a device registration database 710. The device registration database can operate to store the features that are accessible via each third-party circuit board that has been combined with a configurable circuit board and activated with a vehicle or other mechanical device. In at least one embodiment, the server 702 can receive an indication of the features associated with a third-party circuit board and/or an identity (i.e., a model, a type, a class, etc.) of the third-party circuit board associated with the device. Upon receiving the registration information regarding the third-party circuit board, the device registration database 710 can be updated with the device and the features associated with the registration message. For example, once a third-party circuit board from a key fob associated with a delivery vehicle is combined into a device with a configurable circuit board, the device and the third-party circuit board can be registered with the device registration database 710 such that the controls and features associated with the third-party circuit board are stored and associated with the configurable circuit board.

In some embodiments, memory 704 includes an authentication and verification module 712. The authentication and verification module 712 can operate in combination with the asset assignment database 716 to authenticate a request regarding a user device received from a device and/or a device associated with the device. Additionally, the authentication and verification module 712 can determine, based at least in part on the asset assignment database 716, and report information regarding the user device to the device and/or an associated device to confirm or deny the authentication and verification request. Continuing the above example, where a user device attempts to access the controls and features associated with a third-party circuit board that has been incorporated into a device via a configurable circuit board, the device can request authentication and verification of the user device. Accordingly, the device can transmit an identifier associated with the user device, and optionally a driver associated with the user device, to confirm that the user device has been assigned to a delivery vehicle associated with the device. Accordingly, the authentication and verification module 712 can check the asset assignment database 716 and determine whether the user device has been assigned the device and by extension the delivery vehicle.

In some embodiments, memory 704 includes a user device assignment module 714. The user device assignment module 714 can operate in combination with the asset assignment database 716 to associate user devices with devices and ultimately assign users to vehicles and/or mechanical devices. In particular, the user device assignment module 714 can operate to identify one or more users that are to be assigned to one or more vehicles and/or mechanical devices associated with registered devices in the device registration database 710. Accordingly, the drivers can be given access to the features provided by the devices listed by the device registration database 710. Additionally, by updating the asset assignment database 716 to associate individual devices with the user devices, the user devices can be provided an indication of the device and/or an address of the device that enables communication between the user device and the assigned device. Continuing the above example, the user device assignment module 714 can operate to assign a device comprised of a third-party circuit board and a configurable circuit board to a user device, and optionally a driver. The user assignment module 714 can operate to determine that the user device is to be associated with a delivery vehicle and given access to one or more controls and/or functions of the delivery vehicle via triggers implemented via the configurable circuit board.

Although the subject matter has been described in language specific to structural features and/or methodological acts, it is to be understood that the subject matter defined in the appended claims is not necessarily limited to the specific features or acts described above. Rather, the specific features and acts are disclosed as exemplary forms of implementing the claims.

What is claimed is:

1. A method comprising:
    determining one or more functions that are associated with a custom circuit board;
    determining, based at least in part on the one or more functions, one or more interaction points associated with the custom circuit board;
    determining, based at least in part on the one or more interaction points, an interaction point layout of the one or more interaction points;
    determining, based at least in part on the interaction point layout of the one or more interaction points, a configurable circuit board comprised of:
        one or more configurable connection points arranged in a configurable connection point layout that mirrors the interaction point layout;
        one or more physical interface connection points individually associated with the one or more configurable connection points; and
        a generic interface attached to the one or more physical interface connection points; and
    installing, based at least in part on the custom circuit board, connectors in the one or more configurable connection points arranged in the configurable connection point layout, such that the connectors contact the one or more interaction points arranged in the interaction point layout and are maintained between the custom circuit board and the configurable circuit board,
    wherein the generic interface facilitates a connection between a user device and the one or more functions of the custom circuit board such that the generic interface is configured to remotely receive an indication from the user device indicating that a function of the one or more functions is to be triggered by the configurable circuit board.

2. The method of claim 1, wherein determining the configurable circuit board further comprises:
    determining one or more additional custom circuit boards;

identifying, based at least in part on the one or more additional custom circuit boards, one or more additional interaction points associated with one or more additional functions associated with the one or more additional custom circuit boards; and generating, based at least in part on the one or more interaction points and the one or more additional interaction points, the configurable circuit board comprised of the one or more configurable connection points.

3. The method of claim 2, further comprising determining an additional set of the one or more configurable connection points associated with the one or more additional interaction points.

4. The method of claim 2, further comprising determining one or more shared functions between the one or more functions associated with the custom circuit board and the one or more additional functions associated with the one or more additional custom circuit boards.

5. The method of claim 1,
wherein the one or more configurable connection points are configured to send and receive one or more signals associated with each of the one or more functions via individual leads of the generic interface.

6. The method of claim 1, wherein the one or more interaction points associated with the custom circuit board are at least one of test points, debug points, circuit leads, or DPIO points associated with the custom circuit board and at least one function of the one or more functions.

7. The method of claim 1, wherein determining the one or more interaction points further comprises:
identifying, for an interaction point of the one or more interaction points, one or more points of interest that trigger the function of the one or more functions;
determining, based at least in part on the one or more points of interest, a point of interest associated with an available connection point on the configurable circuit board; and
selecting the point of interest as the interaction point based at least in part on the point of interest being associated with the available connection point.

8. The method of claim 1, wherein the function includes at least:
a lock function that causes a door of a vehicle to prevent entry into the vehicle; and
an unlock function that causes the door of the vehicle to permit the entry into the vehicle.

9. A method comprising:
determining functions that are associated with a custom circuit board;
determining interaction points associated with the functions;
determining an interaction point layout of the interaction points;
determining a configurable circuit board comprised of:
configurable connection points that are arranged in a configurable connection point layout that mirrors the interaction point layout;
physical interface connection points individually associated with the configurable connection points; and
a generic interface attached to the physical interface connection points; and
determining connectors in the configurable connection points arranged in the configurable connection point layout, such that the connectors contact the interaction points arranged in the interaction point layout,
wherein the generic interface facilitates a connection between a user device and the functions of the custom circuit board such that the generic interface is configured to remotely receive an indication from the user device indicating that a function of the functions is to be triggered by the configurable circuit board.

10. The method of claim 9, wherein the connectors are maintained between the custom circuit board and the configurable circuit board.

11. The method of claim 9,
wherein the configurable connection points are configured to send and receive signals associated with each of the functions via individual leads of the generic interface.

12. The method of claim 9, wherein the functions include at least:
a lock function that causes a door of a vehicle to prevent entry into the vehicle; and
an unlock function that causes the door of the vehicle to permit entry into the vehicle.

13. The method of claim 12, wherein the vehicle comprises a delivery vehicle.

14. The method of claim 9, wherein the configurable circuit board further comprises one or more additional sets of configurable connection points associated with:
one or more additional circuit boards comprised of one or more additional interaction points; and
one or more additional connectors configured to form additional connections with the one or more additional interaction points.

15. The method of claim 14, further comprising an insulated film inserted between the custom circuit board and the configurable circuit board such that:
the insulated film enables the contact between the connectors and the interaction points; and
the insulated film prevents additional contact between the one or more additional connectors and the custom circuit board.

16. A method comprising:
determining a custom circuit board comprising functions associated with a vehicle;
determining interaction points on the custom circuit board that are associated with the functions;
determining an interaction point layout of the interaction points;
determining a configurable circuit board comprised of:
configurable connection points that are arranged in a configurable connection point layout that mirrors the interaction point layout;
physical interface connection points individually associated with the configurable connection points; and
a generic interface attached to the physical interface connection points; and
installing connectors in the configurable connection points arranged in the configurable connection point layout, such that the connectors contact the interaction points arranged in the interaction point layout,
wherein the generic interface facilitates a connection between a user device and the functions of the custom circuit board such that the generic interface is configured to remotely receive an indication from the user device indicating that a function of the functions is to be triggered by the configurable circuit board.

17. The method of claim 16, wherein the connectors are maintained between the custom circuit board and the configurable circuit board.

18. The method of claim 16,
wherein the configurable connection points are configured to send and receive signals associated with each of the functions via individual leads of the generic interface.

19. The method of claim 16, wherein the functions associated with the vehicle include at least:
- a lock function that causes a door of the vehicle to prevent entry into the vehicle; and
- an unlock function that causes the door of the vehicle to permit entry into the vehicle.

20. The method of claim 16, further comprising receiving, via one or more transceivers, one or more indications that cause the configurable circuit board to trigger the functions associated with the vehicle.

\* \* \* \* \*